United States Patent
Zhu et al.

(10) Patent No.: US 12,297,718 B2
(45) Date of Patent: May 13, 2025

(54) METHODS OF HYDROLYZING NITROGEN-CONTAINING WASTE PLASTICS DOWNGOLE TO FORM A SOLID BARRIER

(71) Applicant: SAUDI ARABIAN OIL COMPANY, Dhahran (SA)

(72) Inventors: Shitong Sherry Zhu, Cambridge, MA (US); Marta Antoniv, Cambridge, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/489,675

(22) Filed: Oct. 18, 2023

(65) Prior Publication Data

US 2025/0129690 A1 Apr. 24, 2025

(51) Int. Cl.
*E21B 41/00* (2006.01)
*C09K 8/88* (2006.01)

(52) U.S. Cl.
CPC .......... *E21B 41/0064* (2013.01); *C09K 8/885* (2013.01)

(58) Field of Classification Search
CPC .............................. E21B 41/0064; C09K 8/885
See application file for complete search history.

(56) References Cited

U.S. PATENT DOCUMENTS

| 6,919,383 | B2 | 7/2005 | Khan et al. |
| 7,626,062 | B2 | 12/2009 | Carner |
| 2004/0102330 | A1* | 5/2004 | Zhou ..................... C09K 23/18 507/100 |
| 2009/0062593 | A1* | 3/2009 | Bruno ................ B01D 53/1475 588/250 |
| 2011/0030958 | A1* | 2/2011 | Fedorov .................. C09K 8/68 166/305.1 |
| 2013/0048283 | A1* | 2/2013 | Makarychev-Mikhailov ............. C09K 8/68 166/280.2 |
| 2015/0129231 | A1* | 5/2015 | Vittur .................... E21B 21/068 166/305.1 |
| 2021/0340351 | A1 | 11/2021 | Fan et al. |
| 2022/0275201 | A1* | 9/2022 | Dong ..................... C08L 67/04 |

FOREIGN PATENT DOCUMENTS

| CN | 1569802 | A | 1/2005 |
| DE | 1088063 | B | 9/1960 |
| WO | 2014040634 | A1 | 3/2014 |

OTHER PUBLICATIONS

Parker, L., The world's plastic pollution crisis explained. National Geographic Jun. 7, 2019, (Environment).

(Continued)

*Primary Examiner* — Silvana C Runyan
(74) *Attorney, Agent, or Firm* — Vorys, Sater, Seymour and Pease, LLP

(57) ABSTRACT

Methods and systems including introducing a treatment fluid into a subterranean formation wellbore. The treatment fluid includes an aqueous base fluid; nitrogen-containing waste plastic; and carbon dioxide. The nitrogen-containing waste plastic is hydrolyzed in the aqueous base fluid under conditions in the subterranean formation wellbore, thereby forming hydrolysis reaction products. The hydrolysis reaction products and the carbon dioxide are reacted in the subterranean formation wellbore.

12 Claims, 21 Drawing Sheets

(56) References Cited

OTHER PUBLICATIONS

Yamada, H., Amine-based capture of CO2 for utilization and storage. Polymer Journal 2021, 53 (1), 93-102.

Shen, X.; Du, H.; Mullins, R. H.; Kommalapati, R. R., Polyethylenimine Applications in Carbon Dioxide Capture and Separation: From Theoretical Study to Experimental Work. Energy Technology 2017, 5 (6), 822-833.

Annabi N, Mithieux SM, Weiss AS, Dehghani F. The fabrication of elastin-based hydrogels using high pressure CO(2). Biomaterials. Jan. 2009;30(1):1-7.

Sharma, P.; Chakrabarty, S.; Roy, S.; Kumar, R., Molecular View of CO2 Capture by Polyethylenimine: Role of Structural and Dynamical Heterogeneity. Langmuir 2018, 34 (17), 5138-5148.

Merdas, I.; Thominette, F.; Verdu, J., Hydrolytic ageing of polyamide 11—effect of carbon dioxide on polyamide 11 hydrolysis. Polymer Degradation and Stability 2003, 79 (3), 419-425.

Žagar, E.; Češarek, U.; Drinčić, A.; Sitar, S.; Shlyapnikov, I. M.; Pahovnik, D., Quantitative Determination of PA6 and/ or PA66 Content in Polyamide-Containing Wastes. ACS Sustainable Chemistry & Engineering 2020, 8 (31), 11818-11826.

Peng, C.; Crawshaw, J. P.; Maitland, G. C.; Martin Trusler, J. P.; Vega-Maza, D., The pH of CO2-saturated water at temperatures between 308K and 423K at pressures up to 15MPa. The Journal of Supercritical Fluids 2013, 82, 129-137.

Usman Shoukat; Pinto, D. D. D.; Knuutila, H. K., Study of Various Aqueous and Non-Aqueous Amine Blends for Hydrogen Sulfide Removal from Natural Gas. Processes 2019, 7, 160.

R.K. Khanna; Moore, M. H., Carbamic acid: molecular structure and IR spectra. Spectrochimica Acta Part A 1999, 55, 961-967.

Goto, M., Sasaki, M. & Hirose, T. Reactions of polymers in supercritical fluids for chemical recycling of waste plastics. J Mater Sci 41, 1509-1515 (2006).

Devasahayam, Sheila, Review: Opportunities for simultaneous energy/materials conversion of carbon dioxide and plastics in metallurgical processes, Sustainable Materials and Technologies, vol. 22, 2019.

Wang, Y., Zhang, Y., Polk, M.B., Kumar, S. and Muzzy, J.D. (2003). Recycling of Carpet and Textile Fibers. In Plastics and the Environment, A.L. Andrady (Ed.).

Lu, Ji Jun, and H. Hamouda. "Current Status of Fiber Waste Recycling and Its Future." Advanced Materials Research 878 (Jan. 2014): 122-31.

* cited by examiner

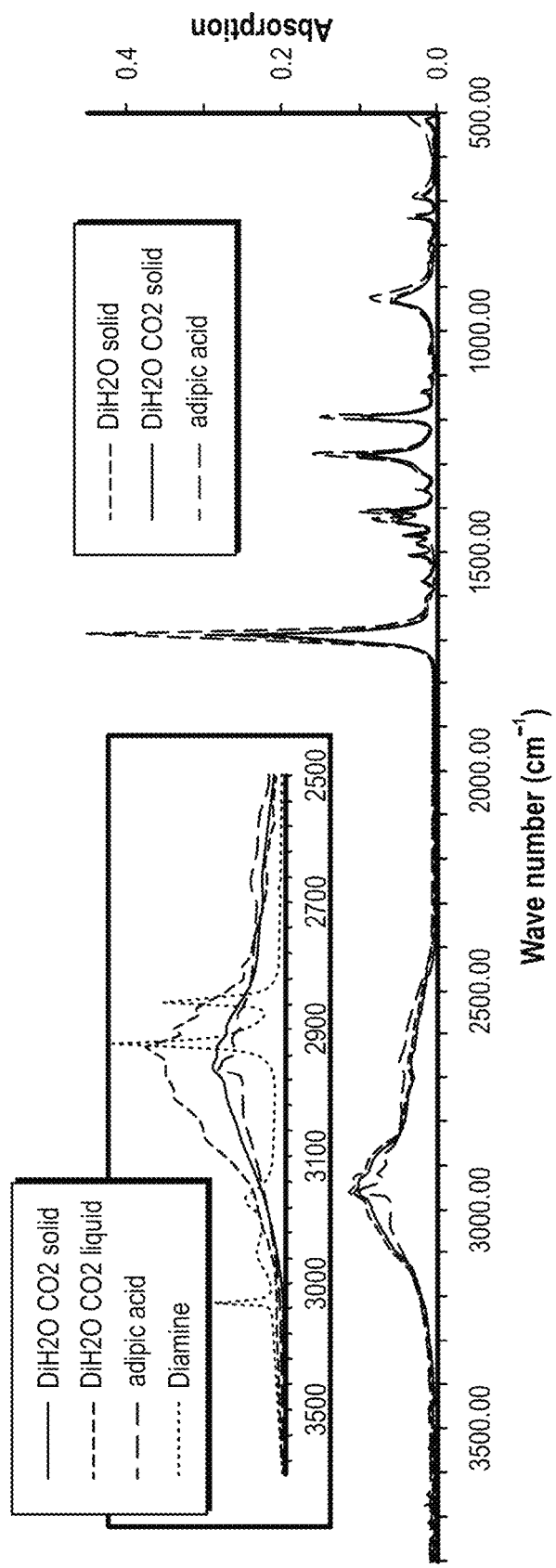
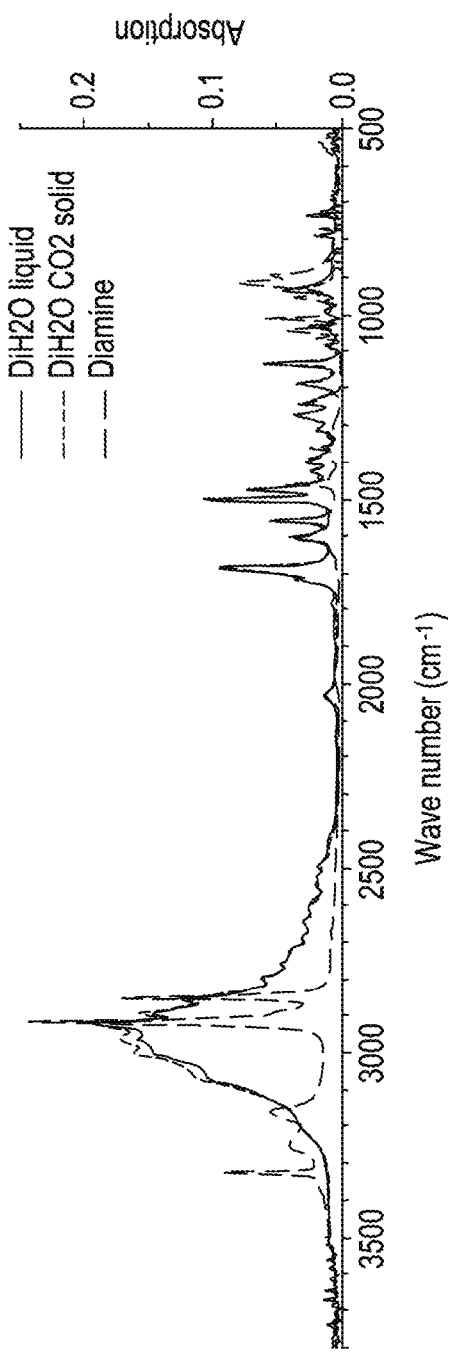
FIG. 4A
FIG. 4B

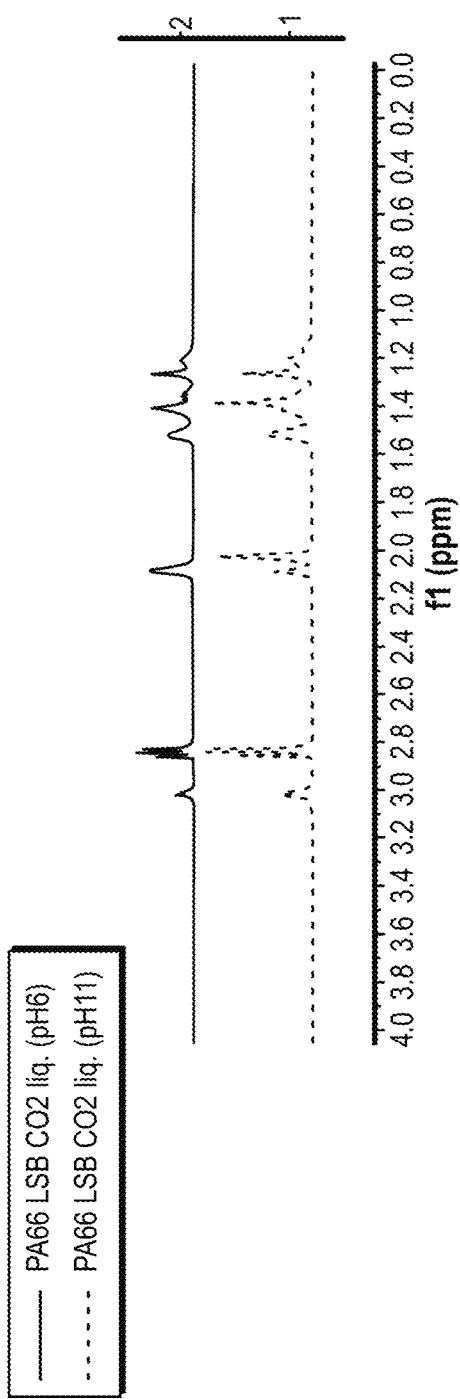
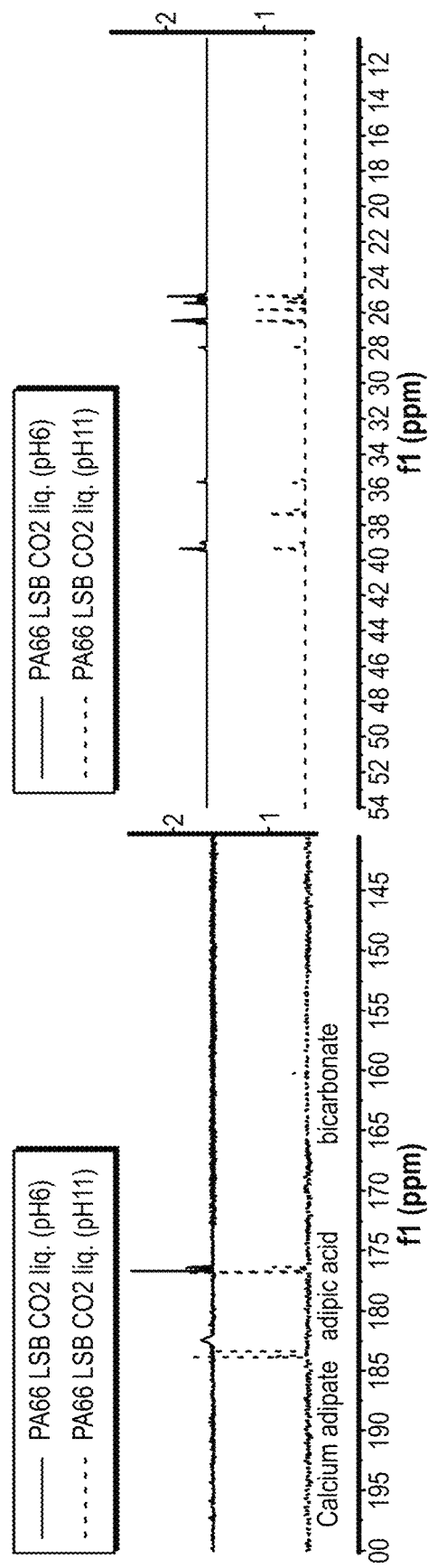
FIG. 14A
FIG. 14B

METHODS OF HYDROLYZING NITROGEN-CONTAINING WASTE PLASTICS DOWNHOLE TO FORM A SOLID BARRIER

FIELD OF THE DISCLOSURE

The present disclosure relates generally to oilfield production and, more particularly, to systems and methods for fluid storage in a subterranean formation using waste plastics.

BACKGROUND OF THE DISCLOSURE

Plastic pollution is a critical environmental issue. Indeed, rapid industrialization in the past century has contributed to the increasing accumulation of waste plastics, such as nylon, polyurethane, polyimide, polypropylene, polyethylene, polystyrene, and the like in the environment. Production increased exponentially from 1950 to 2015, from 2.3 million to 448 million tons, and is expected to double by 2050. With new efforts to combat climate change by improvements of gas-mileage for internal combustion engine vehicles and developments in electrical or hybrid vehicles to reduce carbon emission, more and more nonmetallic materials have been developed to reduce energy consumption, and thus, an increase in plastics have and will continue to be discarded at the end of their lifetime. Standard recycling of these waste plastics is an energy intensive process.

In geological formations, various fluids may be present that require permanent storage, including carbon dioxide ($CO_2$) and hydrogen sulfide ($H_2S$).

$CO_2$ storage has recently been the subject of intense research and development activities in a number of fields, primarily due to its environmental impact as a greenhouse gas. In this regard, significant pressure has been placed on various industries to decrease their $CO_2$ emissions in order to address the effects of global warming and ocean acidification. Currently, $CO_2$ absorption (or $CO_2$ scrubbing) is performed using amines for post-combustion $CO_2$ capture. Such amines include mono-ethanolamine (MEA) and di-ethanolamine (DEA), which are Lewis acids that bind $CO_2$ to form carbamates, carbamic acids, or bicarbonates when water is present. Other technologies include solid absorbents functionalized with polymeric amines (e.g., polyethylen-imine, polyvinyl amine, and the like). However, corrosion, degradation, and scalability hurdles limit large-scale application of amine absorbents. Moreover, the cost associated with the use of such chemicals can be quite high.

$H_2S$ is a gas that is extremely flammable and highly toxic. Due to its toxicity, the Environmental Protection Agency (EPA) has classified $H_2S$ as hazardous waste, and which require strict containment regulations. $H_2S$ is further one of the leading causes of workplace gas inhalation deaths in the United States and, thus, its safe storage is of great importance.

In view of the foregoing, there is a need to both reduce waste plastic and store fluids (e.g., $CO_2$ and/or $H_2S$) within geological formations for environmental purposes.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided including introducing a treatment fluid into a subterranean formation wellbore, the treatment fluid comprising: an aqueous base fluid; nitrogen-containing waste plastic; and carbon dioxide; hydrolyzing the nitrogen-containing waste plastic in the aqueous base fluid under conditions in the subterranean formation wellbore, thereby forming hydrolysis reaction products; reacting the hydrolysis reaction products and the carbon dioxide in the subterranean formation wellbore.

In another embodiment, a system is provided including a pump fluidly coupled to a tubular, the tubular extending into a subterranean formation wellbore and containing a treatment fluid, the treatment fluid comprising: an aqueous base fluid; nitrogen-containing waste plastic; and carbon dioxide, wherein the nitrogen-containing waste plastic is present in an amount of from 8 wt. % to 30 wt. %, by weight of the aqueous base fluid.

In a further embodiment, a method is provided including introducing a treatment fluid into a subterranean formation wellbore, the treatment fluid comprising: an aqueous base fluid and nitrogen-containing waste plastic; hydrolyzing the nitrogen-containing waste plastic in the aqueous base fluid under conditions in the subterranean formation wellbore, thereby forming hydrolysis reaction products; reacting the hydrolysis reaction products and the hydrogen sulfide in the subterranean formation wellbore.

In still another embodiment, a system is provided including a pump fluidly coupled to a tubular, the tubular extending into a subterranean formation wellbore and containing a treatment fluid, the treatment fluid comprising: an aqueous base fluid and nitrogen-containing waste plastic; wherein the nitrogen-containing waste plastic is present in an amount of from 8 wt. % to 30 wt. %, by weight of the aqueous base fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 4A provides Fourier transform infrared (FTIR) spectra of the DI-$H_2O$ $CO_2$ solid of Example 1, the DI-$H_2O$ solid (no $CO_2$) of Example 1, and adipic acid.

FIG. 4B provides Fourier transform infrared (FTIR) spectra of the DI-$H_2O$ $CO_2$ liquid of Example 1, the DI-$H_2O$ liquid (no $CO_2$) of Example 1, and diamine.

FIG. 14A provides the $^1$H NMR spectra of the freeze-dried liquid phase of HSB2 $LCO_2$ before adjusting pH (pH=6) and after adjusting pH to 11 and reacting with $CO_2$.

FIG. 14B provides the $^{13}$C NMR spectra of the freeze-dried liquid phase of HSB2 $LCO_2$ before adjusting pH (pH=6) and after adjusting pH to 11 and reacting with $CO_2$.

DETAILED DESCRIPTION

Figure 1:
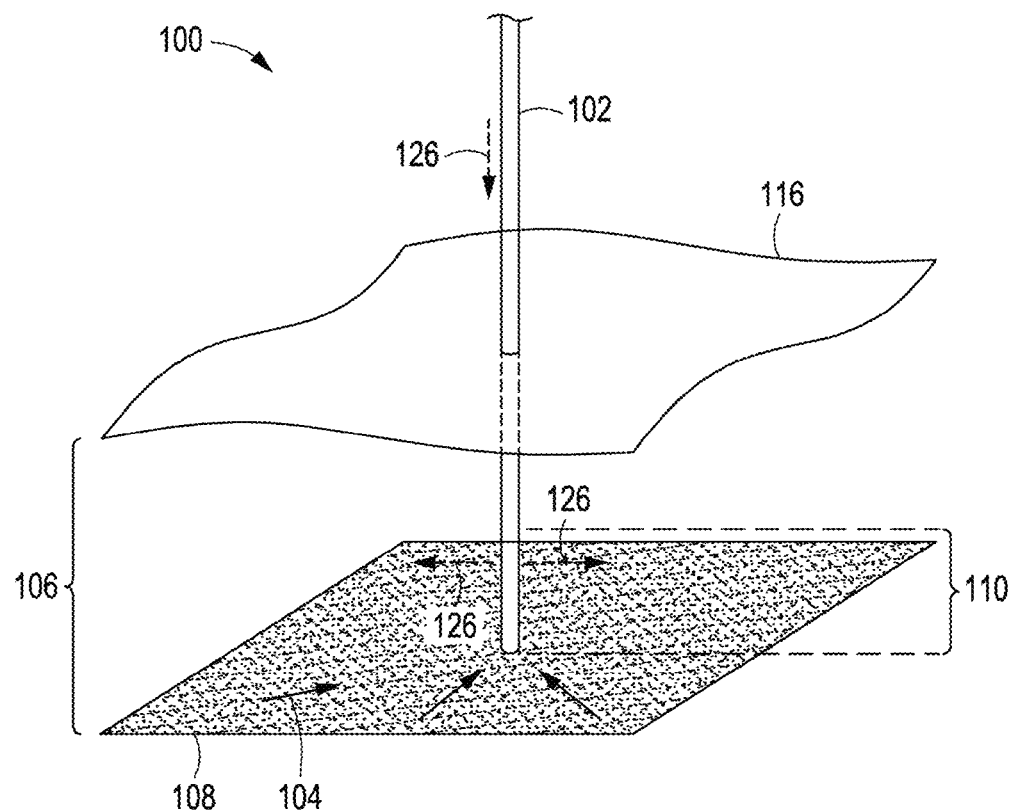
FIG. 1 is a schematic drawing of a method of sealing a wellbore to decrease coproduction of water and store fluids of the present disclosure.

Embodiments of the present disclosure will be described in detail in some instances with reference to various Figures herein throughout. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to oilfield production and, more particularly, to systems and methods for waste plastics assisted $CO_2$ storage in a subterranean formation and $H_2S$ removal from the flowback of downhole fluids.

A large portion of $CO_2$ must be stored in available and proven geological formations for permanent storage with no liability of migration and/or leakage centuries. That is, $CO_2$ storage should result in permanent mineralization of the sequestered gases (capture and storage). Physical locations for geological sequestration of the vast amount of $CO_2$ are limited.

As provided in the present disclosure, it has been determined that waste plastic can be used as a low-cost, and environmentally friendly way to store gases within a geological formation.

As used herein, the term "geological formation," and grammatical variants thereof, refers to a subterranean (underground) geological formation.

As used herein, "carbon dioxide" or "$CO_2$" includes gaseous forms, liquid forms, supercritical forms, and any combination thereof.

As used herein, the term "$CO_2$ storage," and grammatical variants thereof, refers to the process of storing $CO_2$ in a geological formation.

As used herein, the term "waste plastic," and grammatical variants thereof refers to nitrogen-containing plastics that interact with $CO_2$ and which have been otherwise discarded. The waste plastic may be sourced from a variety of materials, such as automotive, aviation, or boat or marine components, motor oil or lubricant containers, plastic food containers or components thereof, plastic tanks that hold liquid hydrocarbons, engineering materials, or any combination thereof.

The term "fluids," as used herein, refers to gases, liquids, and solids, particularly $CO_2$ fluids, as defined herein.

Carbon Dioxide Storage

As provided herein, the present disclosure provides systems and methods for storing $CO_2$ in a geological formation by absorption with nitrogen-containing waste plastics. Such waste plastics may include, but are not limited to, polyamides (e.g., nylon), polyaramids, polyimides, and any combination thereof. Polyamides, particularly, is a widely used polymer with a rapidly increasing demand driven by the automotive and electronics industries. Indeed, the global polyamide production was 8.9 million tons in 2020 and is projected to reach 10.4 million tons by 2027. Moreover, polyamides are one of the most resistant materials to biodegradation; however, polyamide bonds can be hydrolyzed at high temperatures and low pH (acidic) water to form amines and acids (hydrolysis reaction products), as provided in the following chemical Equation 1:

Equation 1

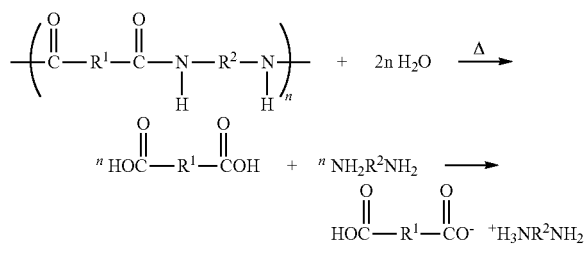

The degradation of polyamides, polyaramids, and polyimides results in carboxylic acids and amines. Accordingly, waste plastics comprising such plastics can provide a low-cost source of amines for reaction with $CO_2$. The high temperature and high humidity aqueous environment within a geological formation moreover can provide the energy (heat) and water for the hydrolysis of such waste plastics. Further, $CO_2$ is an acidic gas that, when dissolved in water will lower the pH of the water to about 3.0 to about 4.2, encompassing any value and subset therebetween, depending on the pressure and temperature. Thus, dissolving $CO_2$ in water can provide the acidic condition to facilitate the degradation of polyamides, polyaramids, and polyimides.

It is further to be noted that aqueous brines in a geological formation comprise various ions (e.g., $Ca^{2+}$, $Mg^{2+}$, $SO_4^{2-}$, and the like) can also react with the degradation product of polyamides, polyaramids, and polyimides (i.e., acid and amines) to form gels, scales, nanofibers, or slurries that can be used in oil and gas applications, including water management, lost circulation mitigation, $CO_2$ storage, and the like. That is, various methods of the present disclosure can be used for water conformance purposes, where the compositions described herein block water coproduction and such formed plugs can be removed by pumping a strong acid to dissolve the form plugs.

When there is an excess of water, such reactions are shown in Equations 2 and 3 below:

Equation 2

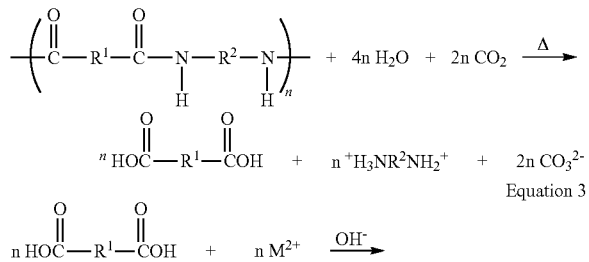

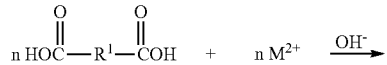

-continued

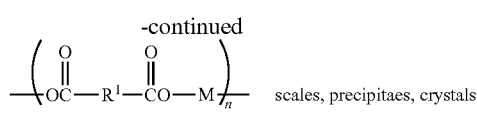 scales, precipitaes, crystals where R1 and R2 are either alkyl groups or aromatic groups, and M are brine cations (e.g., $Ca^{2+}$, $Mg^{2+}$, $Ba^{2+}$, other divalent cations, and the like). Accordingly, as shown in Equation 2, when there is an excess of water, the degradation of waste plastics comprising polyamides, polyaramids, and polyimides results in the formation of diacids and alkyl di-ammonia, which then, as shown in Equation 3 interact with brine ions to form inorganic polymers in the form of gels or solid precipitates.

Differently, when there is a limited amount of water, the degradation of polyamides, polyaramids, and polyimides in the presence of $CO_2$ results the formation of fibers, gels, and scales, as shown in Equations 4 and 5 below:

Equation 4

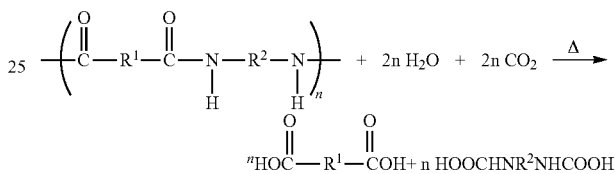

Equation 5

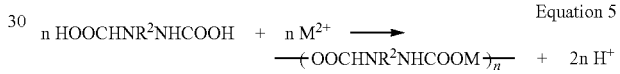

where R1 and R2 are either alkyl groups or aromatic groups, and M are brine cations (e.g., $Ca^{2+}$, $Mg^{2+}$, $Ba^{2+}$, other divalent cations, and the like). Accordingly, as shown in Equation 4, when there is a limited amount of water, the degradation of waste plastics comprising polyamides, polyaramids, and polyimides results in the formation of diacids, di-carbamic acids, or polyamide oligomers, which then, as shown in Equation 5, interact with brine ions to form polymeric fibers, gels, and scales. That is, various methods of the present disclosure can be used for water conformance purposes, where the compositions described herein block water coproduction and such formed plugs can be removed by pumping a strong acid to dissolve the form plugs.

Based on the description provided herein and the Examples provided below, and without being bound by theory, it is believed that the hydrolysis of nitrogen-containing waste plastics, particularly polyamide 6,6 ("PA66"), in the presence of a low-salinity brine ("LS brine") or deionized (DI) water at acidic condition (pH<1) and with or without $CO_2$ at temperatures >140° C., will eventually react (over several days) according to the general Equation 6 below:

Equation 6

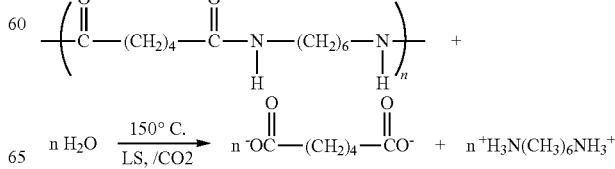

Based on the description provided herein and the Examples provided below, and without being bound by theory, it is believed that the hydrolysis of nitrogen-containing waste plastics, particularly polyamide 6,6 ("PA66"), in the presence of a neutral high salinity (HS) brine (no HCl addition) with $CO_2$ following Equation 7 below:

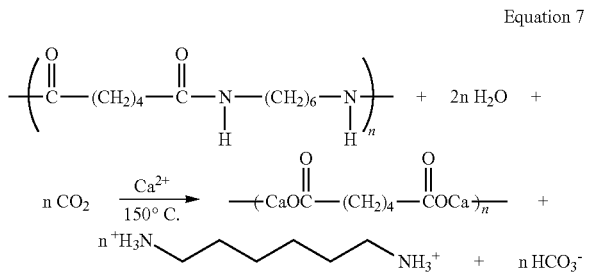

Equation 7

Calcium adipate precipitates as a solid.

Hydrogen Sulfide Storage

As described above, the present disclosure additionally provides systems and methods for storing $H_2S$ in a geological formation by absorption with nitrogen-containing waste plastics. Such waste plastics are described above and may include, but are not limited to, polyamides (e.g., nylon), polyaramids, polyimides, and any combination thereof. These waste plastics react with water to form amines (e.g., upon hydrolysis of polyamides) when can thereafter react with $H_2S$ to turn the $H_2S$ into a water-soluble bisulfide, as shown in Equations 8 and 9 below:

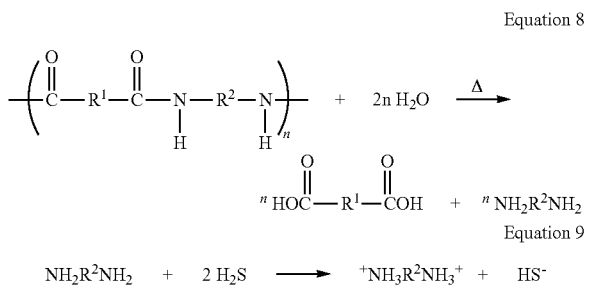

Equation 8

Equation 9 where R1 and R2 are alkyl or aromatic groups.

Treatment Fluids and Methods

Accordingly, the present disclosure provides methods including introducing a treatment fluid into a subterranean formation (e.g., wellbore). The treatment fluids comprise the nitrogen-containing waste plastics, $CO_2$, and an aqueous base fluid.

The aqueous base fluid may include, but are not limited to, fresh water, brine (e.g., water containing one or more salts dissolved therein), seawater, produced water (e.g., water produced from a formation as a byproduct along with oil and gas), waste water (e.g., treated or untreated water adversely affected by anthropogenic influence), and any combination thereof.

The size and shape of the waste plastics is not considered to be particularly limited, provided that it is capable of traveling to a downhole location. In various aspects, the shape may be fibrous, spherical, or otherwise polygonal. Generally, the waste plastic may have a unit mesh size in the range of about 1 micrometers (μm) to about 6500 μm, encompassing any value and subset therebetween, such as in the range of about 1 μm to about 500 μm, or about 500 μm to about 1500 μm, or about 1500 μm to about 3000 μm, or about 3000 μm to about 5000 μm, or about 5000 μm to about 6500 μm. As used herein, the term "unit mesh size," and grammatical variants thereof, refers to a size of an object (e.g., waste plastic) that is able to pass through a square area having each side thereof equal to a specified numerical value.

While the amount of waste plastics may be included in a treatment fluid may be dependent on a number of factors, such as, for example, the amount of $CO_2$ or $H_2S$ downhole to be absorbed and the desired form of solid precipitates (e.g., for fiber, scale, gel formation), in some embodiments, the plastic waste is present in an amount of from about 8 wt. % to about 30 wt. % of the aqueous base fluid, encompassing any value and subset therebetween.

The treatment fluid may further comprise additives to enhance operations. Such additives may be included provided that they do not interfere with the ability of the waste plastic, aqueous base fluid, and $CO_2$ or $H_2S$ to react. Suitable additives may include, but are not limited to a salt, a weighting agent, an inert solid, an emulsifier, a dispersion aid, a corrosion inhibitor, an emulsion inhibitor, an emulsion thickener, a surfactant, a lost circulation material, a foaming agent, a gas, a pH control additive, a biocide, a chelating agent, a scale inhibitor, a gas hydrate inhibitor, a mutual solvent, an oxidizer, a reducer, a friction reducer, a clay stabilizing agent, and any combination thereof.

Referring now to FIG. 1, illustrated is a schematic drawing of a method 100 of sealing section 110 of a wellbore 102 to decrease coproduction of water (e.g., by the formation of fibers, gels, scales, or solid participates) while simultaneously storing a fluid (i.e., $CO_2$) within a geological formation. In the example shown in FIG. 1, the wellbore 102 is shown as vertical. However, the wellbore 102 can be directionally drilled into the reservoir layer 106 (water reservoir layer 106) or otherwise deviated.

The water 104 may come from an underlying water table, or water layer 108, below the reservoir layer 106. A section 110 of the wellbore 102 closest to the water layer 108 may draw water 104 into the wellbore 102 during the pumping cycle of a pump jack 112, for example, at the surface 114, thereby increasing the amount of produced water.

The method 100 begins when the produced fluids include an unacceptable amount of water 104, for example, coproduced from a water layer 108. Such unacceptable water may be greater than about 1 vol % of the produced fluids, greater than about 25 vol % of the produced fluids, or in the range of about 1 vol % to about 50 vol % of the produced fluids, encompassing any value and subset therebetween. The section 110 of the wellbore 102 closest to the water layer 108 may be responsible for the majority of the water 104 that is coproduced. Accordingly, sealing off this section 110 will lower the amount of water 104 in the produced fluids and further provide a mechanism for storing $CO_2$.

A treatment fluid 126 according to the present disclosure comprising waste plastics, $CO_2$, and low-pH brine is pumped into the wellbore 102, for example, through a coil tubing line to the section 110. The treatment fluid 126 may be forced through the section 110 of the wellbore 102 and into the portion of the reservoir layer 106 surrounding the section 110.

Therein, the waste plastics, $CO_2$, and low-pH brine react according to Equations 2, after adjusting pH, then Equation 3 or Equations 4 and 5 to produce fibers, gels, scales, or solid participates, which form a solid barrier 116 above the water layer 108 at section 110 of the wellbore 102. Accordingly, such solid barrier 116 acts not only as a means for $CO_2$ storage, but also as a water conformance mechanism.

Systems

In various embodiments, systems configured for delivering the treatment fluids comprising waste plastics, $CO_2$, and an aqueous base fluid described herein to a downhole location within a geological formation. In various embodiments, the systems can comprise a pump fluidly coupled to a tubular, the tubular containing the treatment fluids described herein.

The pump may be a high pressure pump in some embodiments. As used herein, the term "high pressure pump," and grammatical variants thereof, refers to a pump that is capable of delivering the treatment fluids downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying solid particulate matter, such as the solid waste plastics and other solid additives described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump," and grammatical variants thereof, refers to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
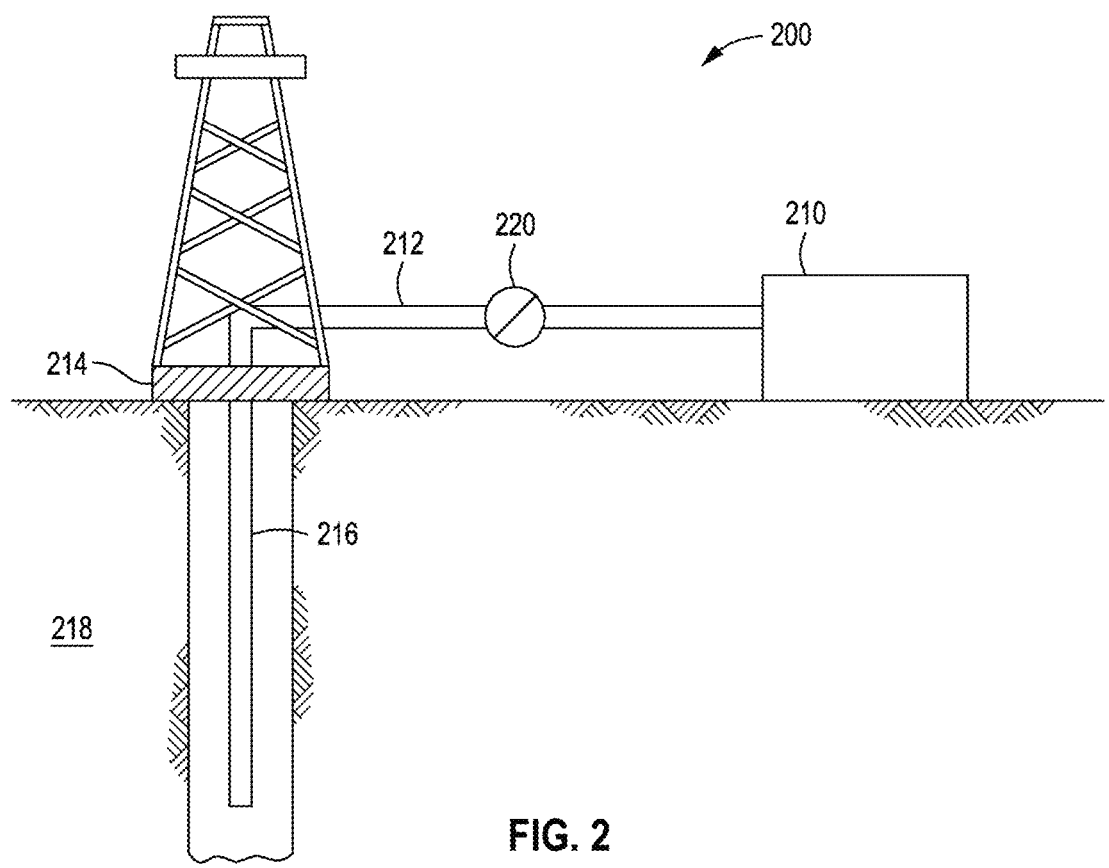
FIG. 2 shows an illustrative schematic of a system that can deliver the treatment fluids of the present disclosure to a subterranean (downhole) location.

FIG. 2 shows an illustrative schematic of a system that can deliver the treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 200 may include mixing tank 210, in which the treatment fluids of the embodiments herein may be formulated. The treatment fluids may be conveyed via line 212 to wellhead 214, where the treatment fluids enter tubular 216, tubular 216 extending from wellhead 214 into subterranean formation 218. Upon being ejected from tubular 216, the treatment fluids may subsequently penetrate into subterranean formation 218. Pump 220 may be configured to raise the pressure of the treatment fluids to a desired degree before introduction into tubular 216. It is to be recognized that system 200 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

EXAMPLE EMBODIMENTS

Embodiments disclosed herein include:

Embodiment A: A method comprising: introducing a treatment fluid into a subterranean formation wellbore, the treatment fluid comprising: an aqueous base fluid; nitrogen-containing waste plastic; and carbon dioxide; hydrolyzing the nitrogen-containing waste plastic in the aqueous base fluid under conditions in the subterranean formation wellbore, thereby forming hydrolysis reaction products; reacting the hydrolysis reaction products and the carbon dioxide in the subterranean formation wellbore.

Embodiment B: A system comprising: a pump fluidly coupled to a tubular, the tubular extending into a subterranean formation wellbore and containing a treatment fluid, the treatment fluid comprising: an aqueous base fluid; nitrogen-containing waste plastic; and carbon dioxide, wherein the nitrogen-containing waste plastic is present in an amount of from 8 wt. % to 30 wt. %, by weight of the aqueous base fluid.

Embodiments A through B may have one or more of the following additional elements:

Element 1: wherein at least a portion of the treatment fluid is introduced into the subterranean formation separately from a remaining portion of the treatment fluid.

Element 2: wherein the nitrogen-containing waste plastic is selected from the group consisting of a polyamide, a polyaramid, a polyimide, and any combination thereof.

Element 3: wherein the nitrogen-containing waste plastic is a polyamide.

Element 4: wherein the nitrogen-containing waste plastic is a polyamide and the hydrolysis reaction products are an acid and an amine.

Element 5: wherein the aqueous base fluid is selected from the group consisting of fresh water, brine, seawater, produced water, waste water, and any combination thereof.

Element 6: wherein the aqueous base fluid comprises one or more divalent cations.

Element 7: wherein the subterranean formation wellbore comprises a water layer.

Element 8: wherein the nitrogen-containing waste plastic is present in an amount of from 8 wt. % to 30 wt. %, by weight of the aqueous base fluid.

Element 9: wherein the reacting results in formation of a solid particulate.

Element 10: wherein the reacting results in the formation of a solid particulate selected from the group consisting of a fiber, a gel, scale, and any combination thereof.

Element 11: wherein the subterranean formation wellbore comprises a water layer and further comprising forming a solid barrier above the water layer as a result of the reacting.

Element 12: further comprising sequestering the carbon dioxide within the subterranean formation wellbore.

By way of non-limiting example, exemplary combinations applicable to Embodiment A include: any one, more, or all of Elements 1-12, without limitation.

By way of non-limiting example, exemplary combinations applicable to Embodiment B include: any one, more, or all of Elements 1-8, without limitation.

Additional Embodiments

Additional Embodiments disclosed herein include:

Embodiment C: A method comprising: introducing a treatment fluid into a subterranean formation wellbore containing hydrogen sulfide, the treatment fluid comprising: an aqueous base fluid and nitrogen-containing waste plastic; hydrolyzing the nitrogen-containing waste plastic in the aqueous base fluid under conditions in the subterranean formation wellbore, thereby forming hydrolysis reaction products; reacting the hydrolysis reaction products and the hydrogen sulfide in the subterranean formation wellbore.

Embodiment D: A system comprising: a pump fluidly coupled to a tubular, the tubular extending into a subterranean formation wellbore that contains hydrogen sulfide and containing a treatment fluid, the treatment fluid comprising: an aqueous base fluid and nitrogen-containing waste plastic, wherein the nitrogen-containing waste plastic is present in an amount of from 8 wt. % to 30 wt. %, by weight of the aqueous base fluid.

To facilitate a better understanding of the embodiments described herein, the following examples of various representative embodiments are given. In no way should the following examples be read to limit, or to define, the scope of the present disclosure.

EXAMPLES

Example 1

In this Example, the precipitation capacity of $CO_2$-based treatment fluids of the present disclosure was evaluated. 0.5 grams (g) of off-grade (that does not meet the QC standard for final product use) PA66 pellets (Chemco Specialists, Inc., North Carolina) was placed in a vial. 5.0 milliliters (mL) of a low-salinity brine ("LS brine") that contained NaCl, $CaCl_2$) and $MgCl_2$ was added to the vial, and the pH of the contents of the vial was adjusted to below 4.0 using HCl. The vial was placed inside a pressure vessel, and about 10 g of dry ice (solid $CO_2$) was added to the vial and the pressure vessel for experimental samples (E1 and E2). The pressure vessel was sealed immediately after $CO_2$ addition. After several hours, it was expected that all $CO_2$ should have partially dissolved in the brine and partially vaporized, and the $CO_2$ in the gas phase versus the dissolved $CO_2$ in the liquid phase should have reached equilibrium.

The pressure vessel was placed inside an oven at 150° C. The stoichiometries of the reactions are shown in Table 1 below. After three days at 150° C., the pressure vessel was cooled to room temperature, and the vial was removed from the pressure vessel.

It was observed that all of the PA66 pellets disappeared. The brine phase was initially clear and then solid precipitates began to appear as the vial cooled, while small bubbles of $CO_2$ arose from the liquid phase. The solid precipitates were filtered (the "LS $CO_2$ solid" in Table 1), the liquid phase was freeze-dried to yield the yellowish solid powder (the "LS $CO_2$ liquid" or residue phase). For comparison, this Example was repeated exactly with LS brine without $CO_2$ (the "LS" in Table 1), in DI water with $CO_2$ (the "DI-$H_2O$ $CO_2$" in Table 1) and without $CO_2$ (DI-$H_2O$), and in high salinity brine with $CO_2$ (the "HSB2 $CO_2$" in Table 1). Each were further filtered into solid and liquid phases and labeled accordingly for further testing.

TABLE 1

|  | LS $CO_2$ | LS | DI-$H_2O$ $CO_2$ | DI-$H_2O$ | HSB2 L$CO_2$ |
|---|---|---|---|---|---|
| PA66 (g) | 0.5 | 0.5 | 0.5 | 0.5 | 0.5 |
| HCl (18-19%) (mL) | 1 | 1 | 1 | 1 | 1 |
| $CO_2$ (g) | 15 | 0 | 15 | 0 | 15 |
| LS brine (mL) | 5 | 5 | 0 | 0 | 0 |
| DI water (mL) | 0 | 0 | 5 | 5 | 0 |
| HS brine (mL) | 0 | 0 | 0 | 0 | 5 |
| $Ca^{2+}$ (M) | 0.28 | 0.28 | 0 | 0 | 0.64 |
| $Mg^{2+}$ (M) | 0.05 | 0.05 | 0 | 0 | 0.15 |

Figure 3A:
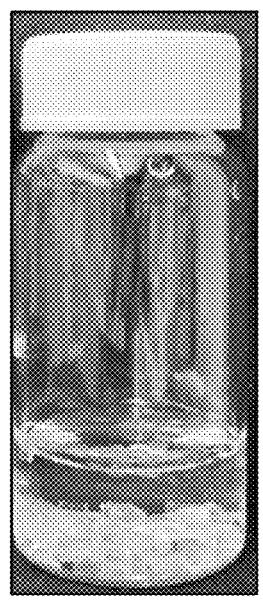
FIG. 3A is a photograph of a treatment fluid before heating in the pressure vessel at 150° C. for 3 days in the presence of $CO_2$.
Figure 3B:
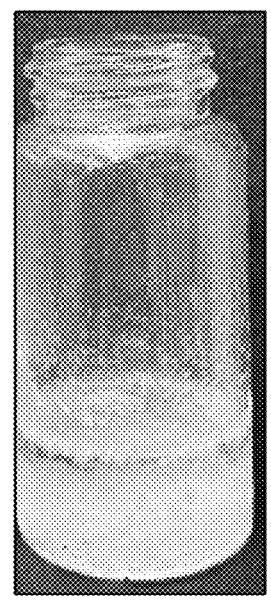
FIG. 3B is a photograph of the treatment fluid of FIG. 3A after heating in the pressure vessel at 150° C. for 3 days in the presence of $CO_2$.

Referring now to FIG. 3A, provided is a photograph of the LS $CO_2$ vial before heating in the pressure vessel at 150° C. for 3 days in the presence of $CO_2$ and FIG. 3B is a photograph of the LS $CO_2$ vial after heating in the pressure vessel at 150° C. for 3 days in the presence of $CO_2$. As shown, the PA66 pellets dissolved in the brine after heating in the pressure vessel.

Example 2

In this Example, the FTIR spectra of various samples were evaluated and is shown in FIGS. 4A-4D.

As shown in FIG. 4A, the FTIR spectra of the DI-$H_2O$ $CO_2$ solid of Example 1, DI-$H_2O$ solid (no $CO_2$) of Example 1, and adipic acid is provided. That is, solid particulates of each of the Example 1 samples were evaluated and adipic acid powder was evaluated because it was expected that the reaction PA66 would hydrolyze and form adipic acid. The FTIR spectra of FIG. 4A demonstrate that the presence of $CO_2$ has insignificant impact on the formed precipitates of PA66, as the FTIR spectra of DI-$H_2O$ $CO_2$ solid and DI-$H_2O$ solid are virtually identical. Moreover, the FTIR spectra of DI-$H_2O$ $CO_2$ solid and DI-$H_2O$ solid are quite similar to the FTIR spectra of adipic acid (with the exception of several peaks at 1475 $cm^{-1}$, 1480 $cm^{-1}$, 1507 $cm^{-1}$, 1563 $cm^{-1}$, 2857 $cm^{-1}$, 3001 $cm^{-1}$, and 3078 $cm^{-1}$—shown in the inset of FIG. 4), thus indicating that a majority of the precipitate samples are adipic acid. The remaining components of the DI-$H_2O$ and DI $H_2O$ $CO_2$ are PA66 oligomers (see NMR spectra below).

FIG. 4B shows the FTIR spectra of the DI-$H_2O$ $CO_2$ liquid of Example 1, DI-$H_2O$ liquid (no $CO_2$) of Example 1, and diamine is provided. That is, the freeze-dried filtration of these samples were evaluated and the diamine, specifically hexamethylenediamine, was evaluated because it was expected that the hydrolysis of PA66 would form diamine. Based on review of FIG. 4B, it appears that the majority of the generated filtration in the samples was not diamine, but protonated diamine and some leftover adipic acid.

Figure 4C:
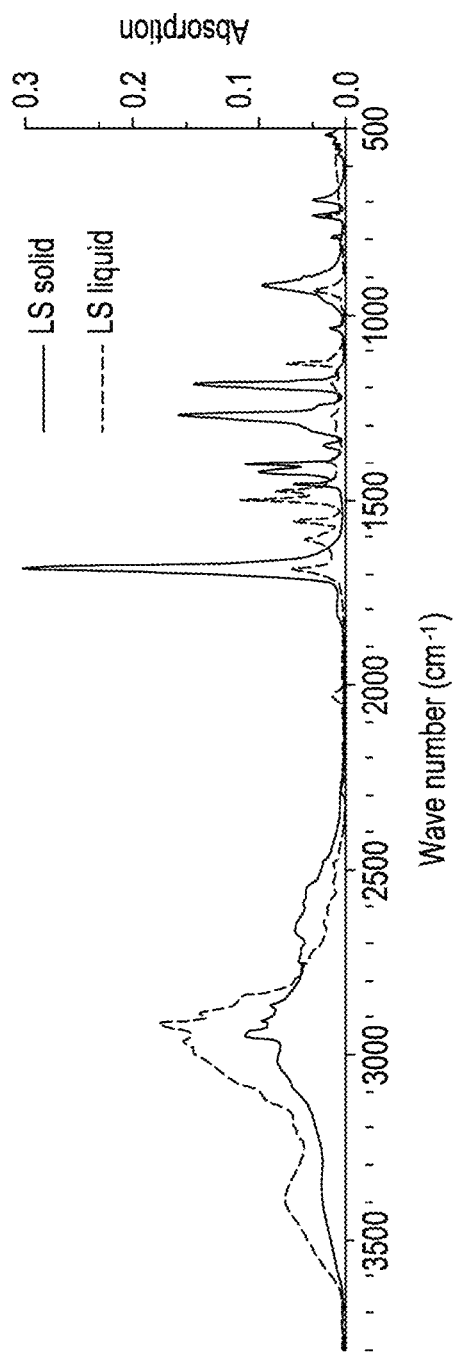
FIG. 4C provides FTIR spectra of the LS solid (no $CO_2$) of Example 1 and LS liquid (no $CO_2$) of Example 1.

FIG. 4C shows the FTIR spectra of the LS liquid (no $CO_2$) of Example 1 and the LS solid (no $CO_2$) of Example 1.

Based on review of FIG. 4C, the FTIR spectra for the LS solid appears to overlap with the spectra of adipic acid (see FIG. 4), except for an extra —OH peak at 3365 cm$^{-1}$, indicating the formation of adipic acid with trapped water. The LS liquid displays a small carbonyl peak at 1692 cm$^{-1}$ and a relatively large —OH peak at 3396 cm$^{-1}$.

Figure 4D:
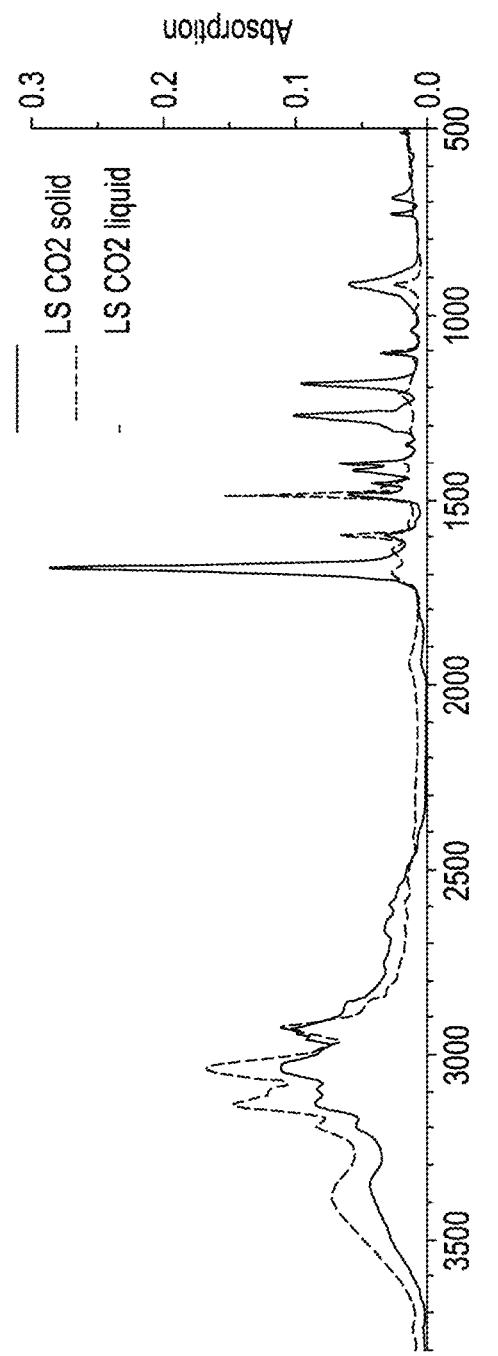
FIG. 4D provides FTIR spectra of the LS $CO_2$ solid of Example 1 and LS $CO_2$ liquid of Example 1.

FIG. 4D shows the FTIR spectra of the LS $CO_2$ liquid of Example 1 and the LS $CO_2$ solid of Example 1. Based on review of FIG. 4D, the FTIR spectra of the LS $CO_2$ solid and LS $CO_2$ liquid are different from the hydrolyzed products without $CO_2$ in the 2200-3600 cm$^{-1}$ range of —$CH_2$ and —OH peaks.

Example 3

Figure 5A:
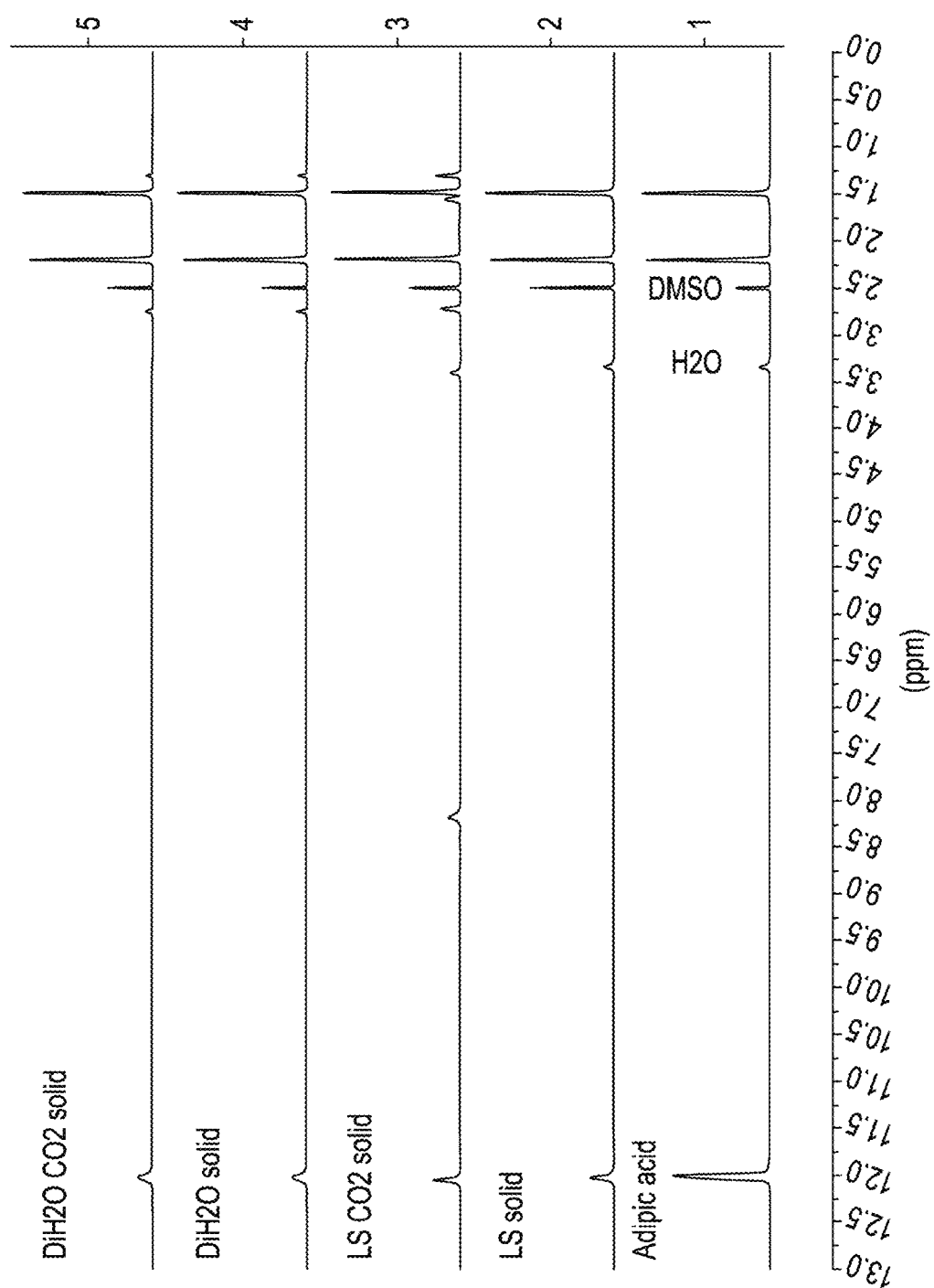
FIG. 5A provides $^1$H NMR (in DMSO-$d_6$) of DI-$H_2O$ $CO_2$ solid of Example 1, DI-$H_2O$ solid (no $CO_2$) of Example 1, LS $CO_2$ solid of Example 1, LS solid (no $CO_2$) of Example 1, and adipic acid.
Figure 5B:
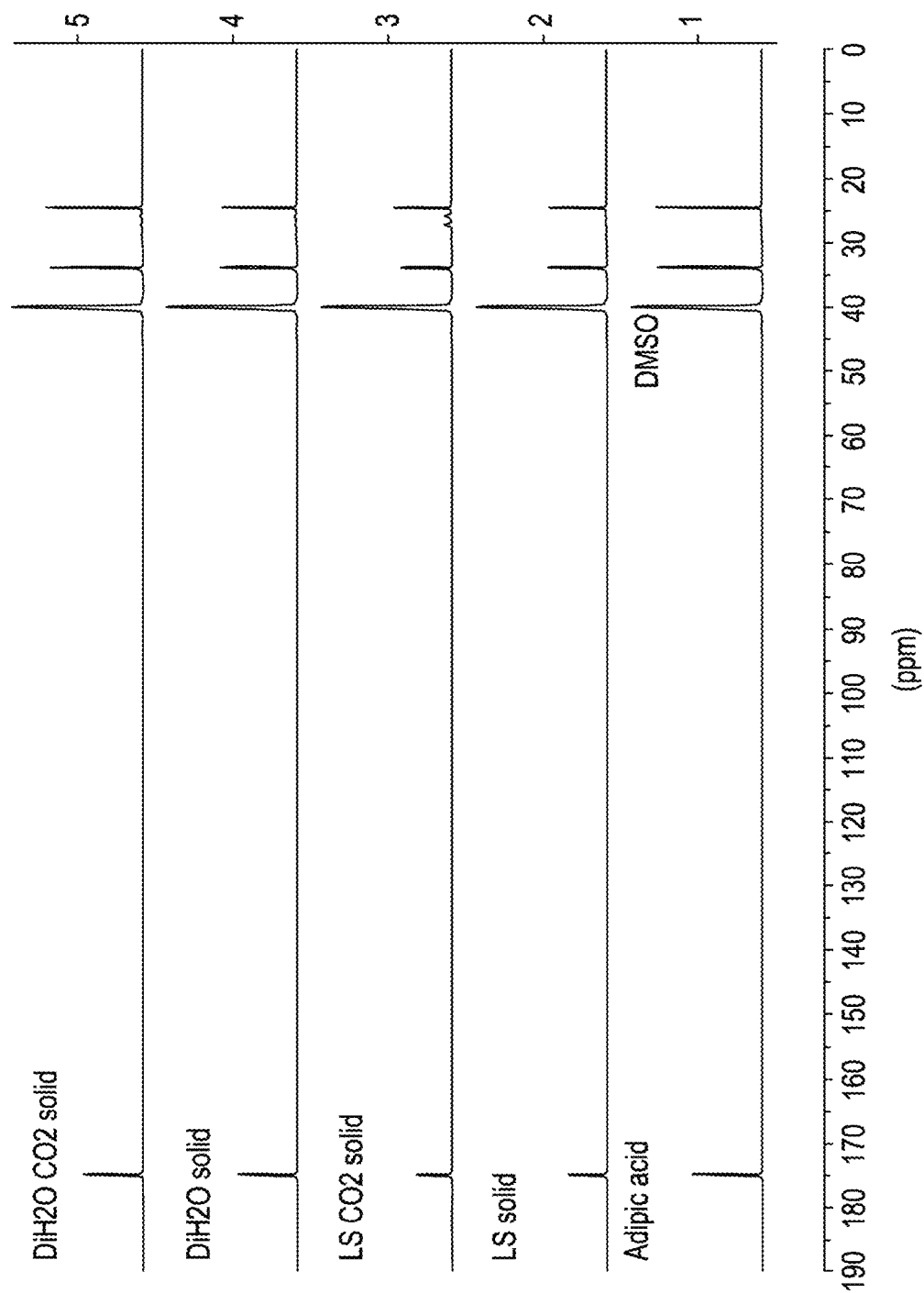
FIG. 5B provides $^{13}$C NMR (in DMSO-$d_6$) of DI-$H_2O$ $CO_2$ solid of Example 1, DI-$H_2O$ solid (no $CO_2$) of Example 1, LS $CO_2$ solid of Example 1, LS solid (no $CO_2$) of Example 1, and adipic acid.

In this Example, the $^1H$ and $^{13}C$ NMR (in DMSO-$d_6$) spectra of various samples were evaluated and is shown in FIGS. 5A-5B.

FIG. 5A provides $^1H$ NMR (in DMSO-$d_6$) of DI-$H_2O$ $CO_2$ solid of Example 1, DI-$H_2O$ solid of Example 1, LS $CO_2$ solid of Example 1, LS solid of Example 1, and adipic acid. FIG. 5B provides $^{13}C$ NMR (in DMSO-$d_6$) of DI-$H_2O$ $CO_2$ solid of Example 1, DI-$H_2O$ solid of Example 1. LS $CO_2$ solid of Example 1, LS solid of Example 1, and adipic acid.

The results indicate that the $^1H$ and $^{13}C$ NMR spectra for DI-$H_2O$ $CO_2$ solid and DI-$H_2O$ solid samples are primarily adipic acid with trace diamine peaks. The results indicate that LS solid sample are primarily adipic acid.

Examples 4

Figure 6A:
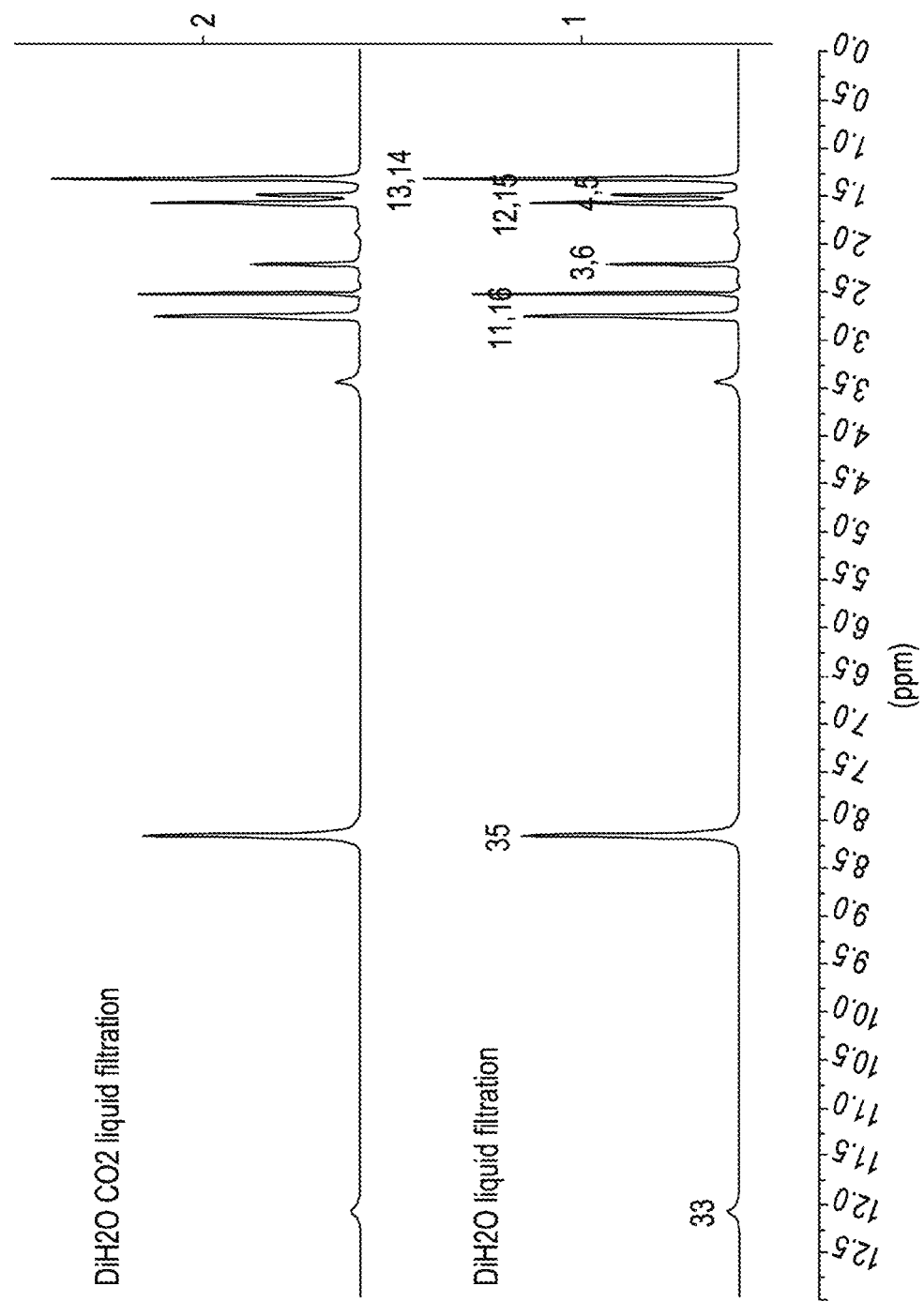
FIG. 6A provides $^1$H NMR (in DMSO-$d_6$) of DI-$H_2O$ $CO_2$ liquid of Example 1 and DI-$H_2O$ liquid (no $CO_2$) of Example 1.
Figure 6B:
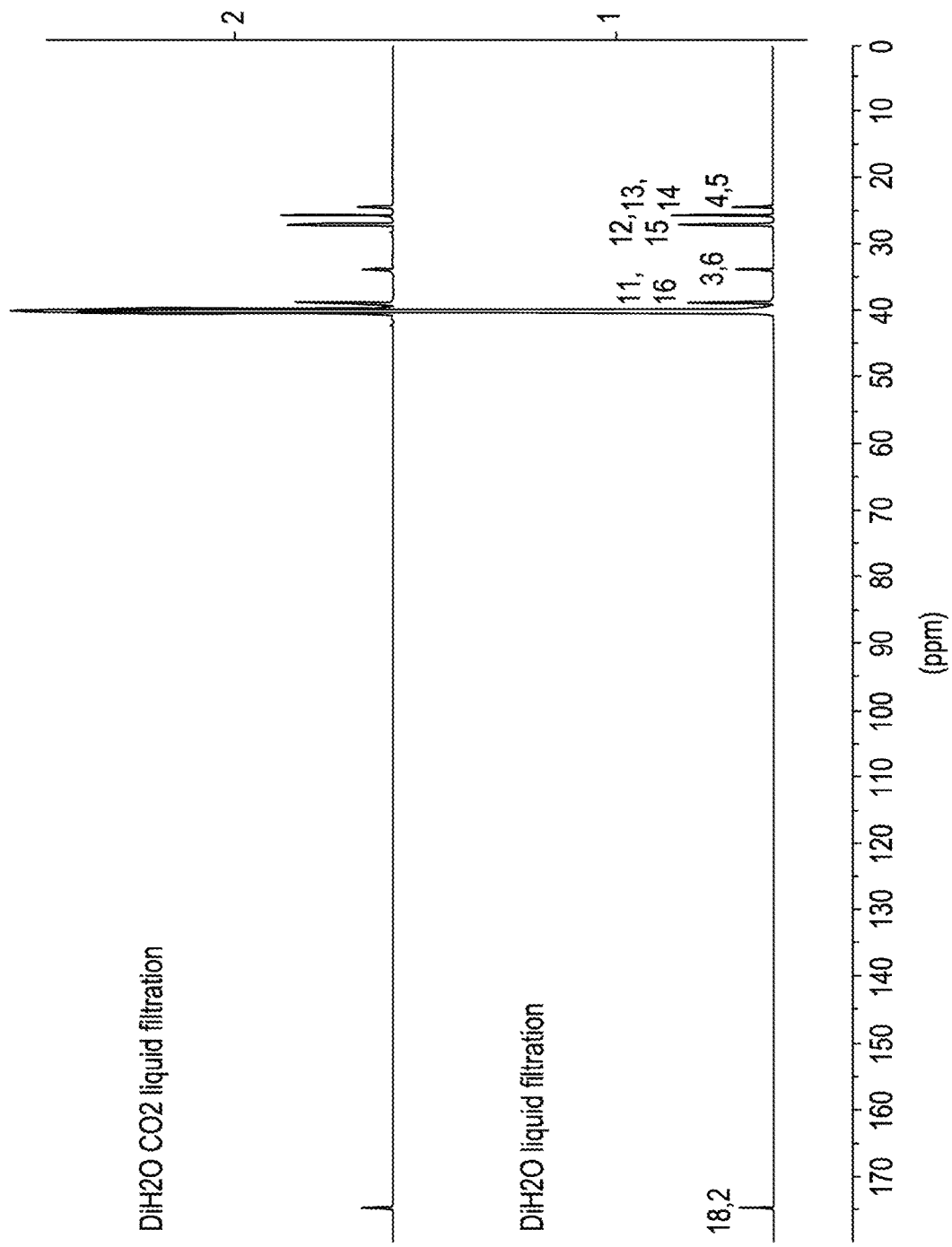
FIG. 6B provides $^{13}$C NMR (in DMSO-$d_6$) of DI-$H_2O$ $CO_2$ liquid of Example 1 and DI-$H_2O$ liquid (no $CO_2$) of Example 1.

In this Example, the $^1H$ and $^{13}C$ NMR (in DMSO-$d_6$) spectra of various samples were evaluated and is shown in FIGS. 6A-6B.

FIG. 6A provides $^1H$ NMR (in DMSO-$d_6$) of DI-$H_2O$ $CO_2$ liquid of Example 1 and DI-$H_2O$ liquid (no $CO_2$) of Example 1. FIG. 6B provides $^{13}C$ NMR (in DMSO-$d_6$) of DI-$H_2O$ $CO_2$ liquid of Example 1 and DI-$H_2O$ liquid (no $CO_2$) of Example 1.

The results indicate that the $^1H$ and $^{13}C$ NMR spectra for DI-$H_2O$ $CO_2$ liquid and DI-$H_2O$ liquid are primarily complexes of adipic acid and protonated diamines.

Example 5

Figure 7A:
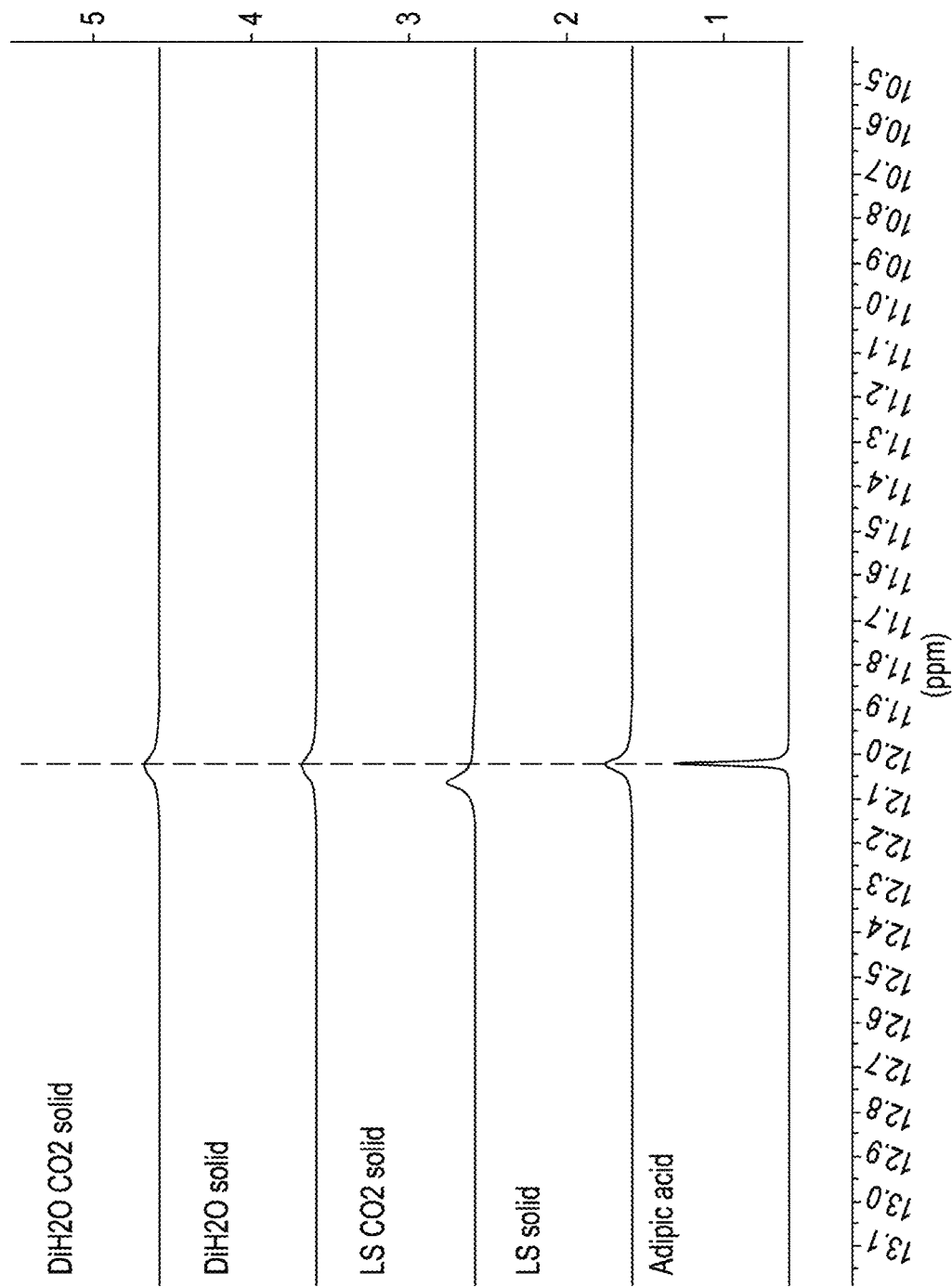
FIG. 7A provides FITR-ATR spectra for LS $CO_2$ solid of Example 1, LS solid (no $CO_2$) of Example 1, DI-$H_2O$ $CO_2$ solid of Example 1, DI-$H_2O$ solid (no $CO_2$) of Example 1, and adipic acid.
Figure 7B:
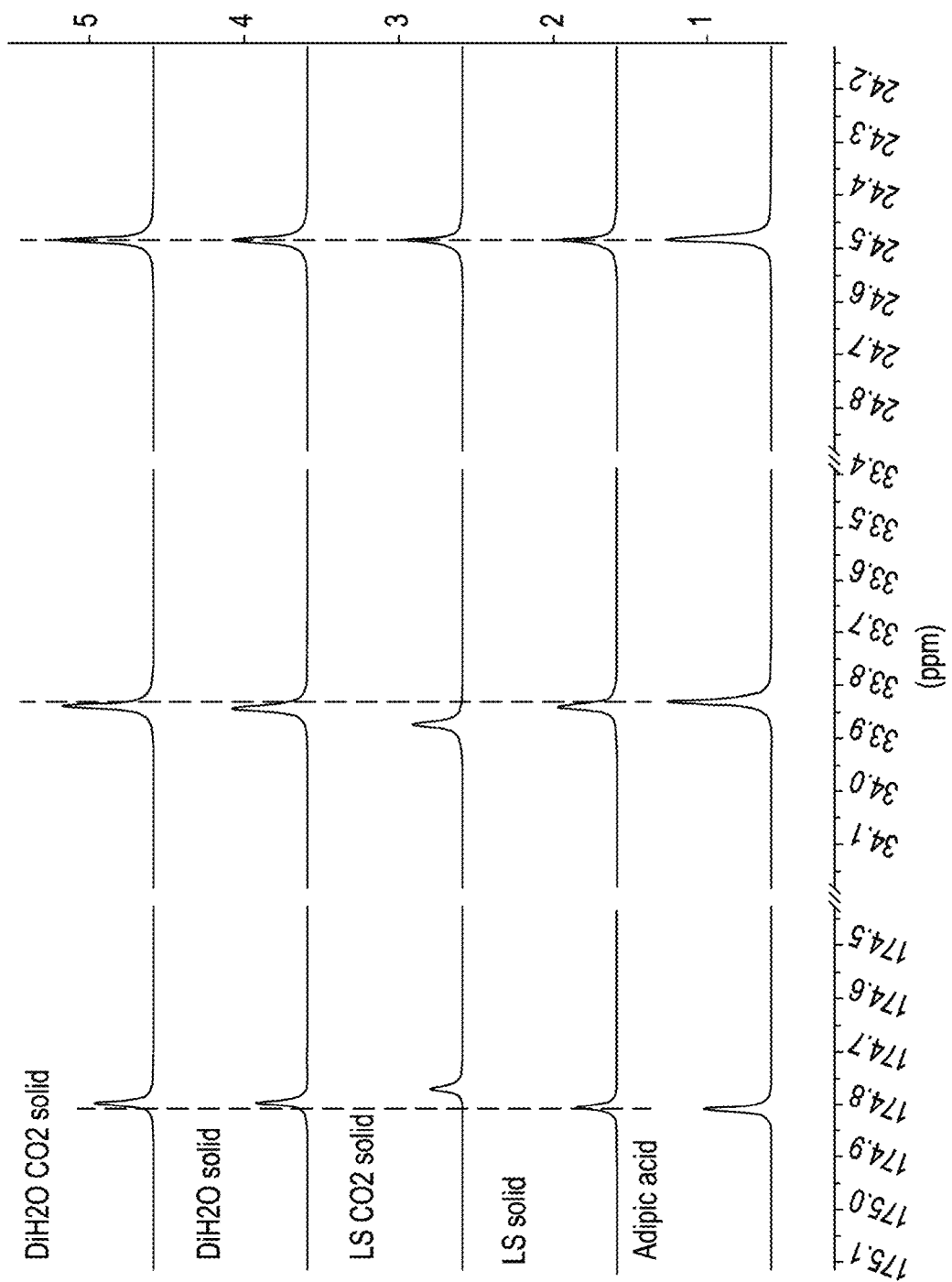
FIG. 7B provides FITR-ATR spectra for LS $CO_2$ liquid of Example 1, LS liquid (no $CO_2$) of Example 1, DI-$H_2O$ $CO_2$ liquid of Example 1, DI-$H_2O$ liquid (no $CO_2$) of Example 1, and diamine.

In this Example, the expanded range of 1300 ppm to 1800 ppm using FTIR-attenuated total reflection (ATR) of various samples were evaluated as shown in FIGS. 7A-7B.

FIG. 7A provides FITR-ATR spectra for LS $CO_2$ solid of Example 1, LS solid (no $CO_2$) of Example 1, DI-$H_2O$ $CO_2$ solid of Example 1, DI-$H_2O$ solid (no $CO_2$) of Example 1, and adipic acid. FIG. 7B provides FITR-ATR spectra for LS $CO_2$ liquid of Example 1, LS liquid (no $CO_2$) of Example 1, DI-$H_2O$ $CO_2$ liquid of Example 1, DI-$H_2O$ liquid (no $CO_2$) of Example 1, and diamine.

The results shown in both FIG. 7A and FIG. 7B that LS $CO_2$ solid has two absorptions at 1600 cm$^{-1}$ and 1495 cm$^{-1}$, which are different than that of the other solid samples, representing reaction products between dissolved $CO_2$ (bicarbonate) and diamine. Further, the FITR-ATR of the LS $CO_2$ liquid is similar to that of the LS $CO_2$ solid in the range of 2200-3600 cm$^{-1}$, except between 500-2000 cm$^{-1}$ (FIG. 4D), indicating similar or the same type of salt formations with different organic components.

Example 6

Figure 8A:
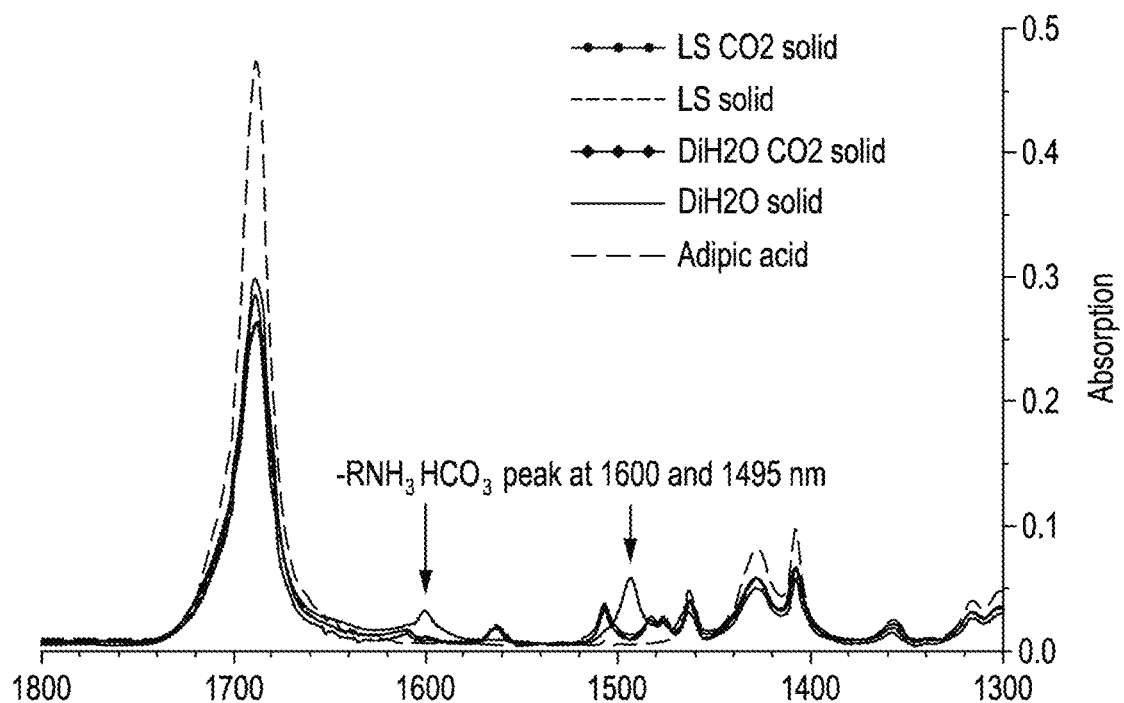
FIG. 8A provides $^1$H NMR (in DMSO-$d_6$) of LS liquid (no $CO_2$) of Example 1, LS $CO_2$ liquid of Example 1, DI-$H_2O$ liquid (no $CO_2$) of Example 1, diamine in LS liquid, and diamine in LS $CO_2$ liquid.
Figure 8B:
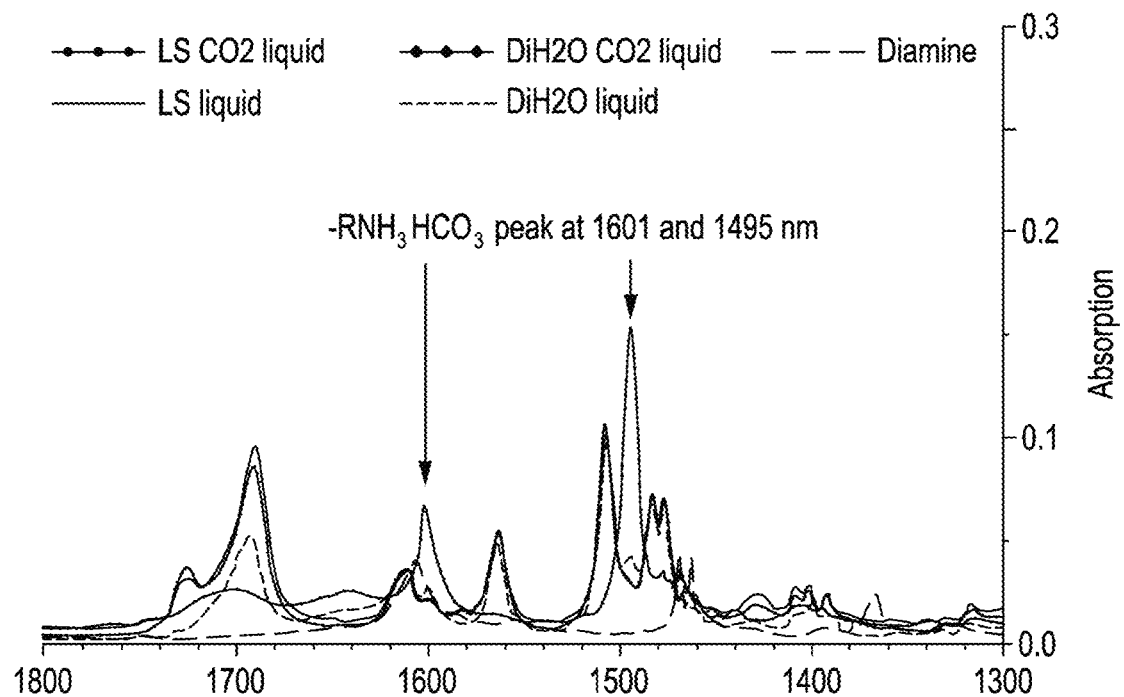
FIG. 8B provides $^{13}$C NMR (in DMSO-$d_6$) of LS liquid (no $CO_2$) of Example 1, LS $CO_2$ liquid of Example 1, DI-$H_2O$ liquid (no $CO_2$) of Example 1, diamine in LS liquid, and diamine in LS CO2 liquid.

In this Example, the $^1H$ and $^{13}C$ NMR (in DMSO-$d_6$) spectra of various samples were evaluated and is shown in FIGS. 8A-8B.

FIG. 8A provides $^1H$ NMR (in DMSO-$d_6$) of LS liquid (no $CO_2$) of Example 1, LS $CO_2$ liquid of Example 1, DI-$H_2O$ liquid (no $CO_2$) of Example 1, diamine in LS liquid (see Example 9), and diamine in LS $CO_2$ liquid (see Example 9).

FIG. 8B provides $^{13}C$ NMR (in DMSO-$d_6$) of LS liquid (no $CO_2$) of Example 1, LS $CO_2$ liquid of Example 1, DI-$H_2O$ liquid (no $CO_2$) of Example 1, diamine in LS liquid (see Example 9), and diamine in LS $CO_2$ liquid (see Example 9).

The results shown in both FIG. 8A and FIG. 8B demonstrate, and further confirm, that the major products in LS $CO_2$ liquid are protonated diamines (diammonium) and the complexes of diammonium and adipic acid, as illustrated by the weak-COOH NMR peaks in the $^1H$ and $^{13}C$ NMR spectra and the presence of —$NH_3^+$ proton peaks at 8.25 ppm in the $^1H$ NMR spectra.

Example 7

In this Example, the precipitation capacity of $CO_2$-based treatment fluids of the present disclosure was evaluated. 0.5 grams (g) of PA66 pellets was placed in a vial. 5.0 milliliters (mL) of a high-salinity brine ("HS brine") that contained NaCl, $CaCl_2$) and $MgCl_2$ was added to the vial, and the pH of the contents of the vial was adjusted to below 4.0 using HCl. The pressure vessel was placed inside an oven at 150° C. The stoichiometries of the reactions are shown in Table 1. After four days at 150° C., the pressure vessel was cooled to room temperature, and the vial was removed from the pressure vessel.

Figure 9:
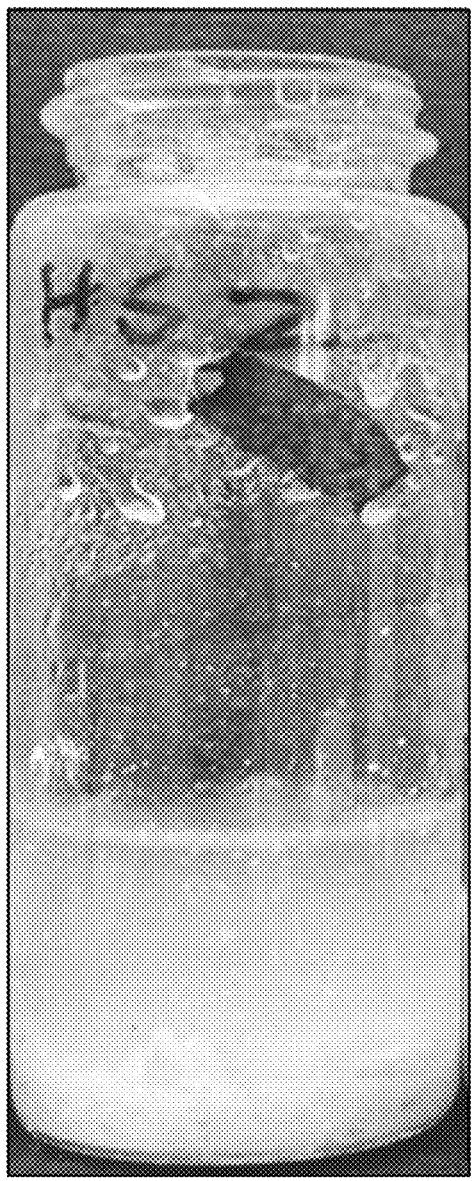
FIG. 9 provides the image of the solid precipitates in HSB2 LCO2

It was observed that the PA66 pellets disappeared. The brine phase was initially clear and then solid adipic acid began to appear as the vial cooled (FIG. 9A). A sodium hydroxide solution was then used to adjust the pH to be around 5-6. All the solid adipic acid was dissolved into the liquid phase. About 10 grams of dry ice was placed in the vial that was placed inside the pressure vessel. The pressure vessel was placed inside an oven at 70° C. overnight. After cooling to room temperature, the vial was removed from the pressure vessel. Solid precipitates were formed in the vial (FIG. 9B). The solid precipitates were filtered (the "HSB2 $LCO_2$ solid" in Table 1), the liquid phase was freeze-dried to yield the yellowish solid powder (the "HSB2 $LCO_2$ liquid" or residue phase).

Example 8

Figure 10:
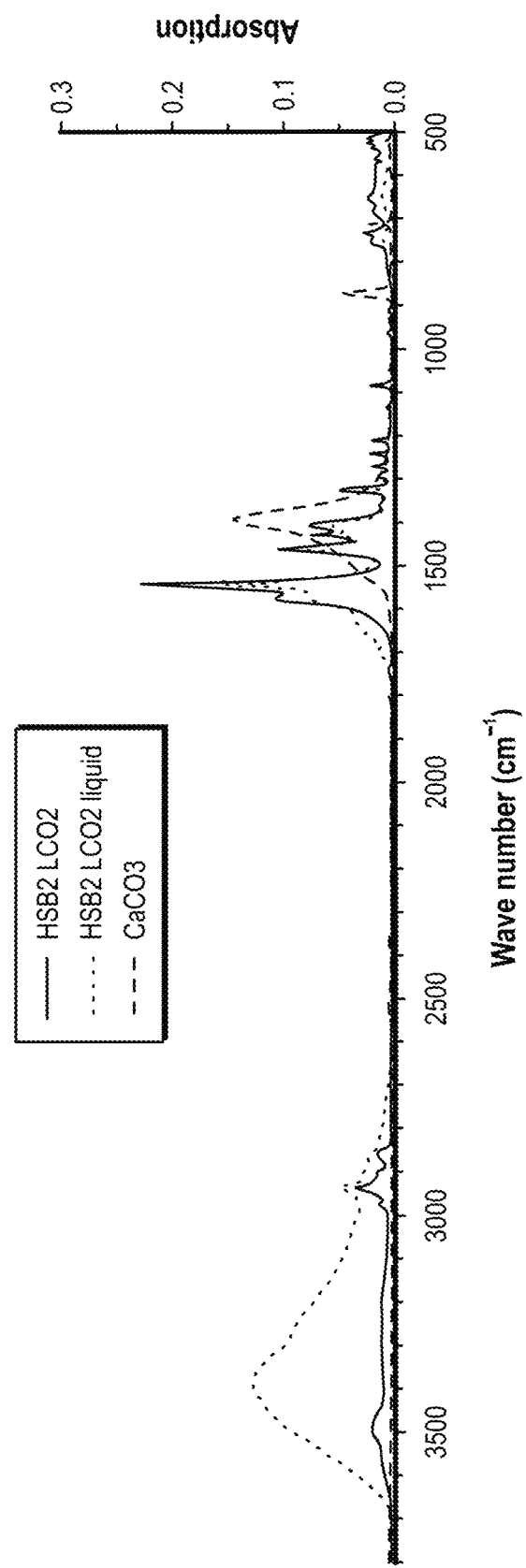
FIG. 10 provide the FTIR-ATR spectra for HSB2 $LCO_2$ (solid), LSB2 $LCO_2$ liquid and $CaCO_3$.

In this Example, FTIR-ATR spectra of "HSB2 $LCO_2$ solid and liquid" of Example 7 and $CaCO_3$ are shown in FIG. 10.

The results show the solid precipitate formed after reacting with $CO_2$ at neutral condition is poly(calcium adipate) (Equation 3) that is not soluble in common solvent such as $H_2O$, DMSO, THF or acetone. The liquid phase contains adipate, and diamine/$H_2O$ indicates by the broad peak between 3000-3600 cm$^{-1}$.

Example 9

In this example, the $^1H$ and $^{13}C$ NMR (in $D_2O$) spectra of HSB2 $LCO_2$ samples were evaluated and is shown in FIGS. 11A-12B.

Figure 11A:
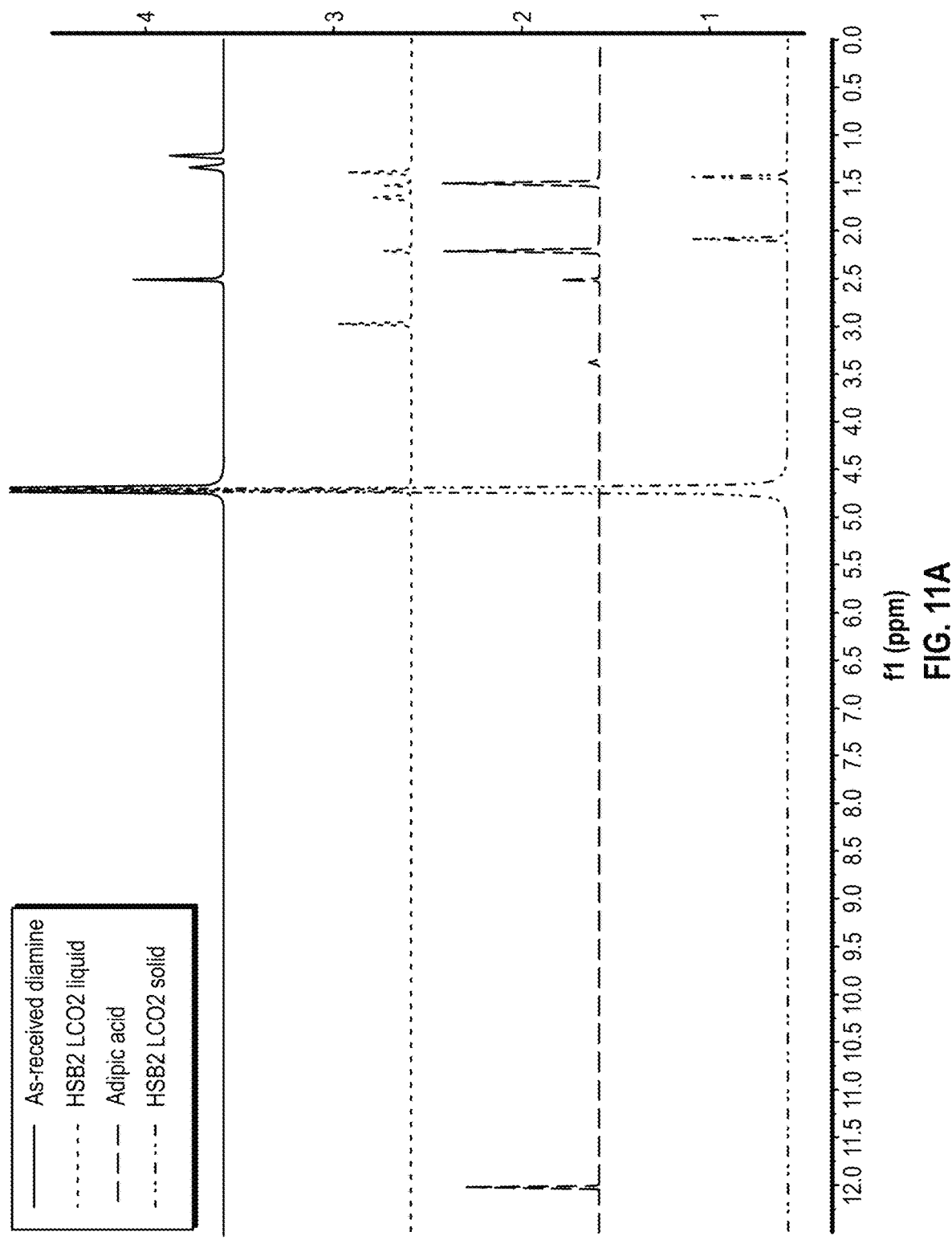
FIG. 11A provides $^1$H NMR (in $D_2O$) of HSB2 $LCO_2$ solid, HSB2 $LCO_2$ liquid, adipic acid, and diamine.
Figure 11B:
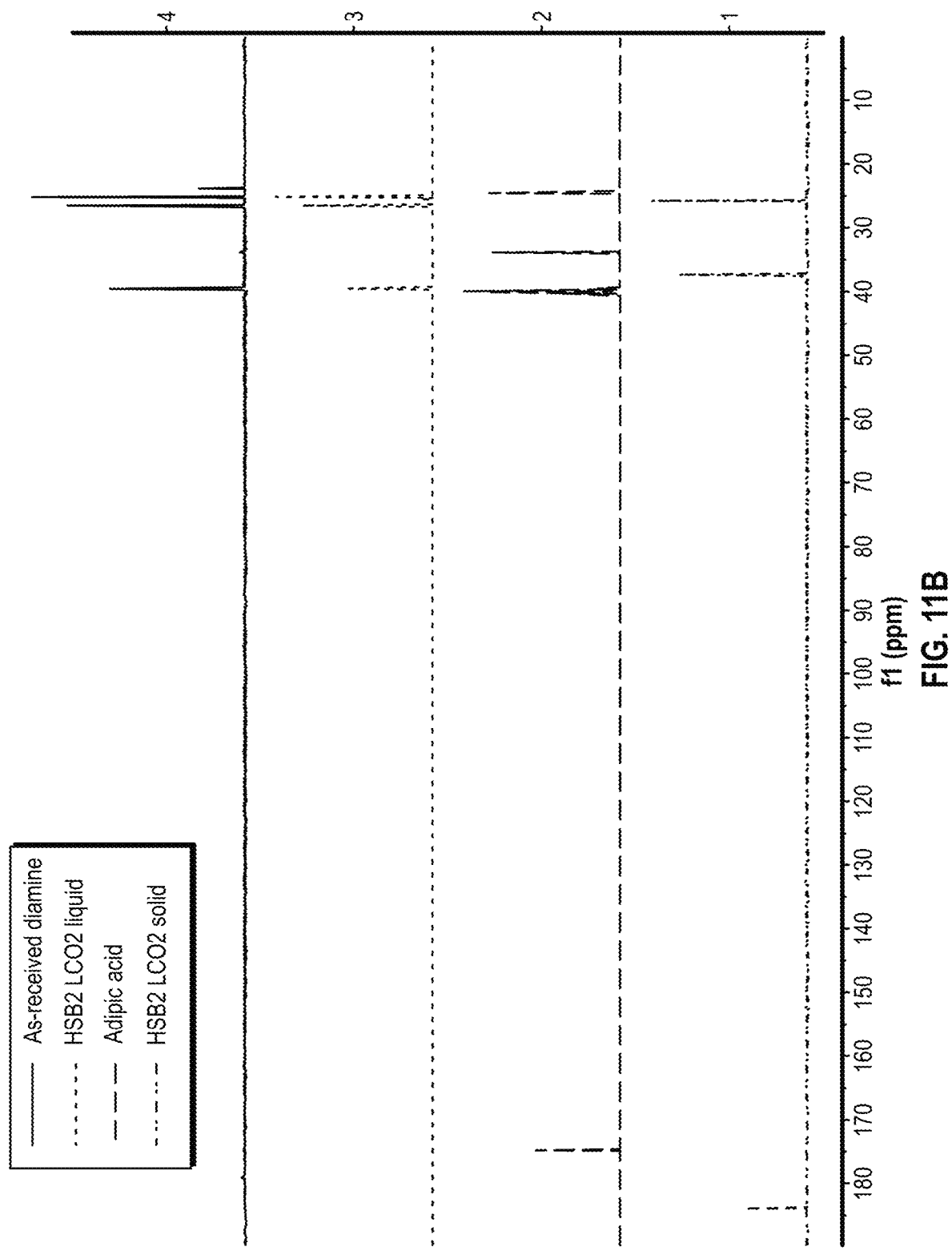
FIG. 11B provides $^{13}$C NMR (in $D_2O$) of HSB2 $LCO_2$ solid. HSB2 $LCO_2$ liquid, adipic acid and diamine.

Solid of HSB2 LCO$_2$ lacks the —COOH proton peak in $^1$H NMR spectrum (FIG. 11A) and —COO$^-$ $^{13}$C peak also shifted downfield compared to that of adipic acid as shown in FIG. 11B. These results confirm the formation of calcium adipate as the solid precipitates.

FIGS. 11A and 11B also suggest that complexes of diamine and adipic acid are left in the liquid phase.

Figure 12:
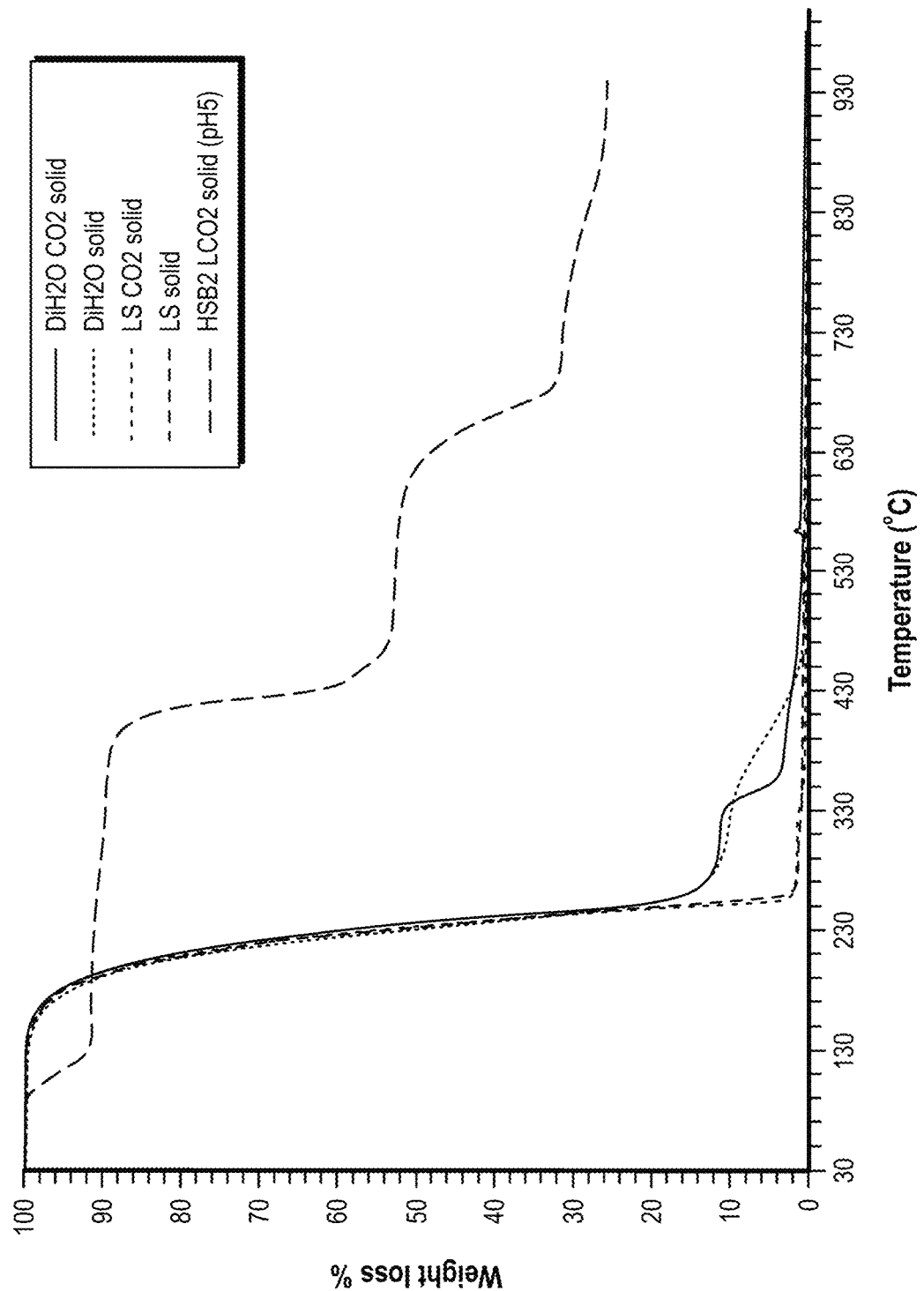
FIG. 12 provides the TGA spectra for the solid of DiH2O $CO_2$, DiH2O (no $CO_2$), LS $CO_2$, LS (no $CO_2$), and HSB2 $LCO_2$ (pH5).

In this Example, a TGA plot of various the DI-H$_2$O CO$_2$ solid of Example 1, the LS CO$_2$ solid of Example 1, and the HSB2 LCO$_2$ of Example 7 is shown in FIG. 12.

The results show, for LS CO$_2$ solid and DI-H$_2$O CO$_2$ solid, a first weight loss at 250° C. from thermal decomposition of adipic acid for and a weight loss occurring at 351.6° C. due to the decomposition of trace adipic acid and diammonium complexes. For HSB2 LCO$_2$, the first weight loss at onset at 99.5° C. is the loss of water from poly(calcium adipate); the second weight loss at an onset of 410.4° C. is a loss of —CO to form calcium oxalate; the third weight loss at 627.5° C. is the loss of CO$_2$ to form CaCO$_3$.

Example 10

In this example, 30% of PA66 (no HCl addition) was hydrolyzed in the low salinity brine (LSB) with CO$_2$ for one month at 150° C. The leftover solid is not soluble in water, DMSO or THF. The FTIR spectrum of the solid indicates that the solid is PA66 (FIG. 13A), suggesting that the degradation time is longer than one month to completely hydrolyze PA66 in LSB (at 30% loading) in a neutral fluid (no HCl) or there is not enough free water in the LS brine for hydrolyzing the high loading of PA66 in the fluid. The pH of the liquid phase after degradation is between 5-6. After adjusting pH of the liquid phase to be >9 using a NaOH solution, CO$_2$ was bubbled into the liquid phase for 20 minutes. Solid precipitated from the liquid phase during CO$_2$ bubbling. The solid was collected for FTIR analysis and the liquid phase was freeze-dried for FTIR and NMR analysis.

Example 11

Figure 13A:
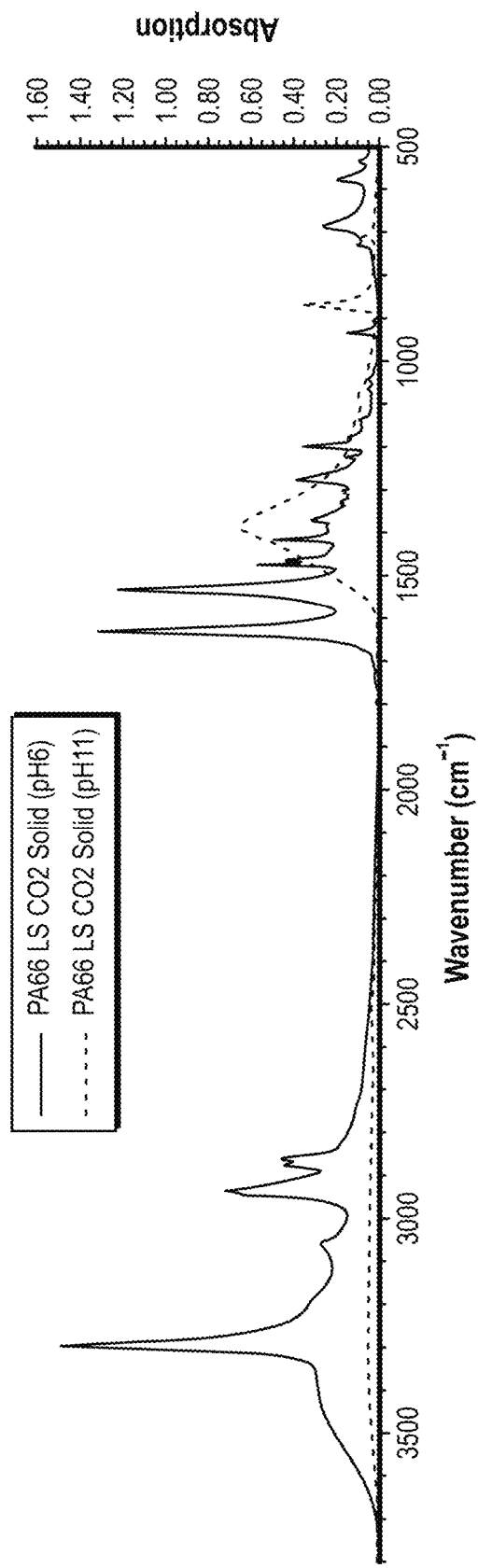
FIG. 13A provides FTIR-ATR spectra of PA66 LS $CO_2$ solid resulting from PA66 hydrolysis in LS brine without addition of HCl and the $CaCO_3$ resulted from reacting PA66 hydrolysis product with $CO_2$ at basic pH.
Figure 13B:
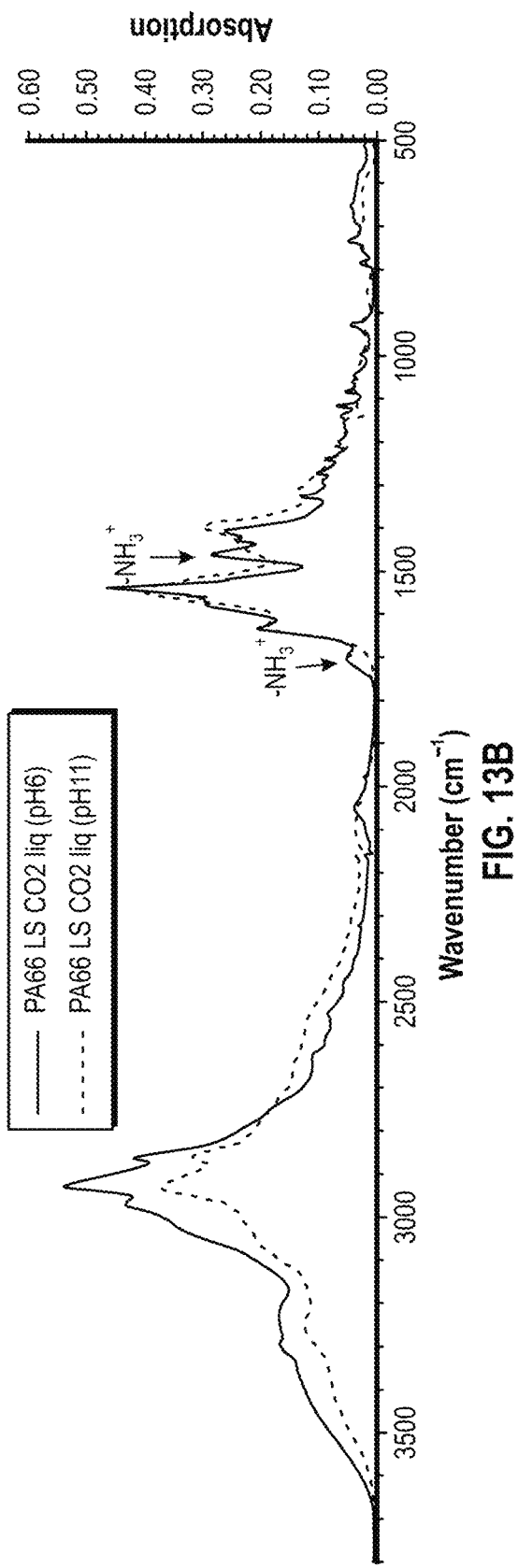
FIG. 13B provides FTIR-ATR spectra of PA66 LS $CO_2$ liquid resulting from PA66 hydrolysis in LS brine without addition of HCl, and the freeze-dried liquid phase after reacting PA66 hydrolysis product with $CO_2$ at basic condition.

In this Example, FTIR-ATR spectra for the leftover PA66 (PA66 LS CO$_2$ solid (pH6)) after hydrolysis and the solid precipitates of calcium carbonate (PA66 LS CO$_2$ solid (pH11)) resulted from bubbling CO$_2$ at basic pH are presented in FIG. 13A. The FTIR spectra for the freeze-dried liquid phase after CO$_2$ bubbling is shown in FIG. 13B. The peaks at 1671 cm$^{-1}$ and 1464 cm$^{-1}$ (arrows) of the diammonium disappeared after bubbling CO$_2$ at basic pH value.

Example 12

In this Example, FIGS. 14A and 14B display the $^1$H and $^{13}$C NMR (in D$_2$O) spectra of the liquid phase after PA66 hydrolysis at pH6 (PA66 LS CO$_2$ liq. (pH6)) and at pH 11 after bubbling CO$_2$ (PA66 LS CO$_2$ liq. (pH11)). FIG. 14B clearly presents the carbonyl $^{13}$C peaks of adipic acid at 176 ppm, adipate at 184 ppm, and bicarbonate at 160 ppm.

Example 13

For comparison with the samples in Example 10, this Example tested control samples by heating diamine or the combination of diamine and dissolved adipic acid in LS brine at 150° C., with or without CO$_2$, for three days. The samples were prepared according to Table 2 below:

TABLE 2

| | Diamine DI-H$_2$O CO$_2$ | Diamine adipic acid LSB CO$_2$ | Diamine adipic acid LSB |
|---|---|---|---|
| Diamine 50% (mL) | 0.5 | 0.5 | 0.5 |
| CO$_2$ (g) | 15 | 15 | 0 |
| H$_2$O or LSB (mL) | 5 | 5 | 5 |
| Adipic acid (g) | 0 | 0.21 | 0.21 |
| Initial pH | ≈12-13 | ≈12-13 | ≈12-13 |

Like Example 10, the diamine adipic acid LS CO$_2$ sample and diamine adipic acid LS sample were filtered, and a solid and liquid sample was obtained for each.

Figure 15A:
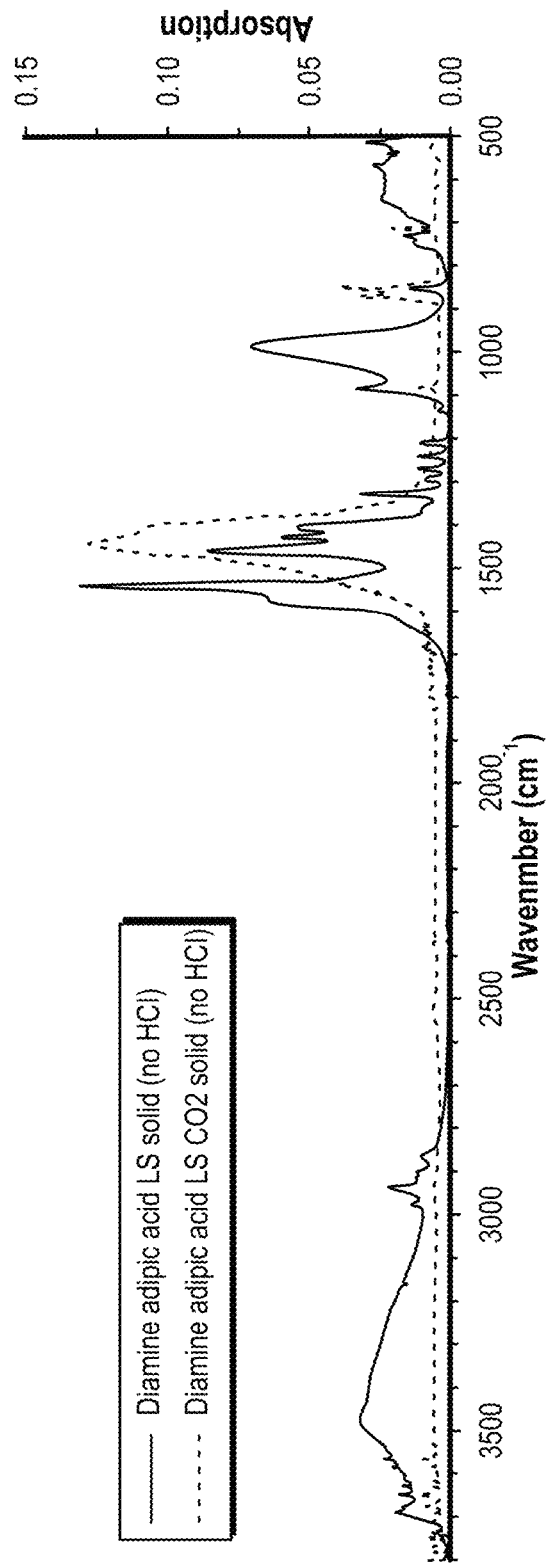
FIG. 15A provides the FTIR-ATR spectra of solid precipitates from diamine adipic acid LS, diamine adipic acid LS $CO_2$ samples.

FIG. 15A provides the FTIR-ATR spectra for the solid poly(calcium adipate) formed from the "Diamine adipic acid LSB" sample and the CaCO$_3$ formed from the "Diamine adipic acid LSB CO$_2$" sample.

Figure 15B:
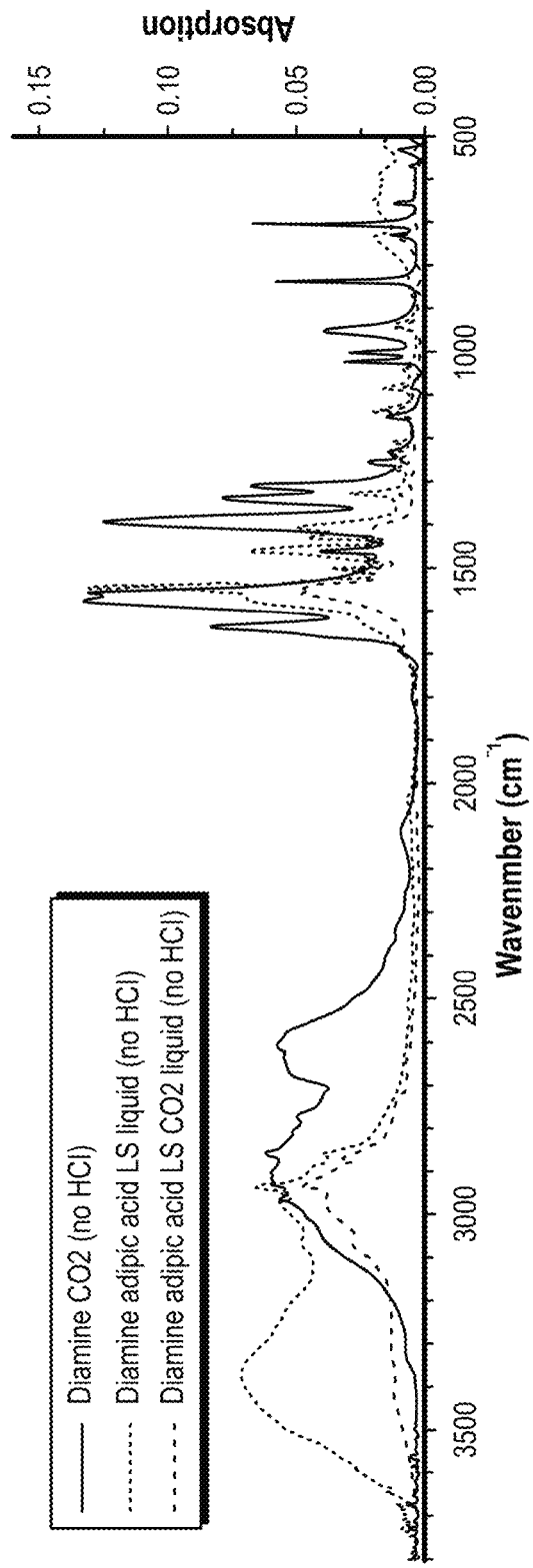
FIG. 15B provides the FTIR-ATR spectra of the freeze-dried liquid phase from diamine adipic acid LS, diamine adipic acid LS $CO_2$, and diamine Di-$H_2O$ $CO_2$ samples.

FIG. 15B provides the FTIR-ATR spectrum for the freeze-dried liquid phase of formed from the "Diamine Di-H$_2$O CO$_2$" sample, which displays the carbamate absorption at 1579 cm$^{-1}$.

FIG. 15B provides the FTIR-ATR spectrum for the freeze-dried liquid phase of "Diamine adipic acid LSB CO$_2$" sample and the "Diamine adipic acid LSB" sample, which show the absorption of diamine and adipates.

Figure 16A:
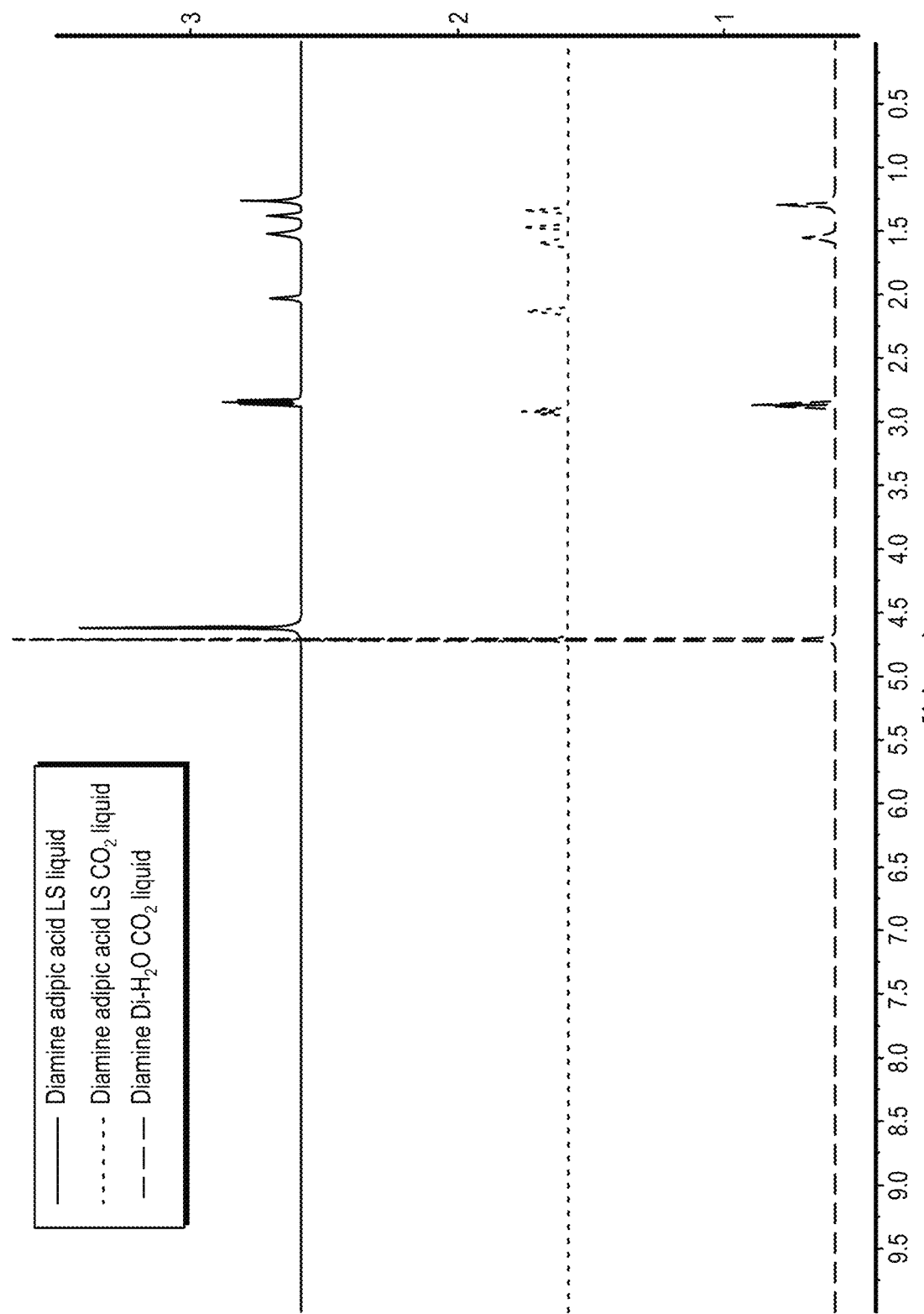
FIG. 16A provides the $^1$H NMR (in $D_2O$) spectra of the freeze-dried liquid phase from diamine adipic acid LS, diamine adipic acid LS $CO_2$, and diamine Di-$H_2O$ $CO_2$ samples.

FIG. 16A provides $^1$H and $^{13}$C NMR spectra (in D$_2$O) of freeze-dried liquid phase of "Diamine Di-H$_2$O CO$_2$," "Diamine adipic acid LS CO$_2$," and "Diamine adipic acid LS."

FIG. 16A presents the typical $^1$H NMR of diamine. The NMR spectra of "Diamine adipic acid LS CO$_2$" and "Diamine adipic acid LS" show a mixture of diamine and adipate.

Figure 16B:
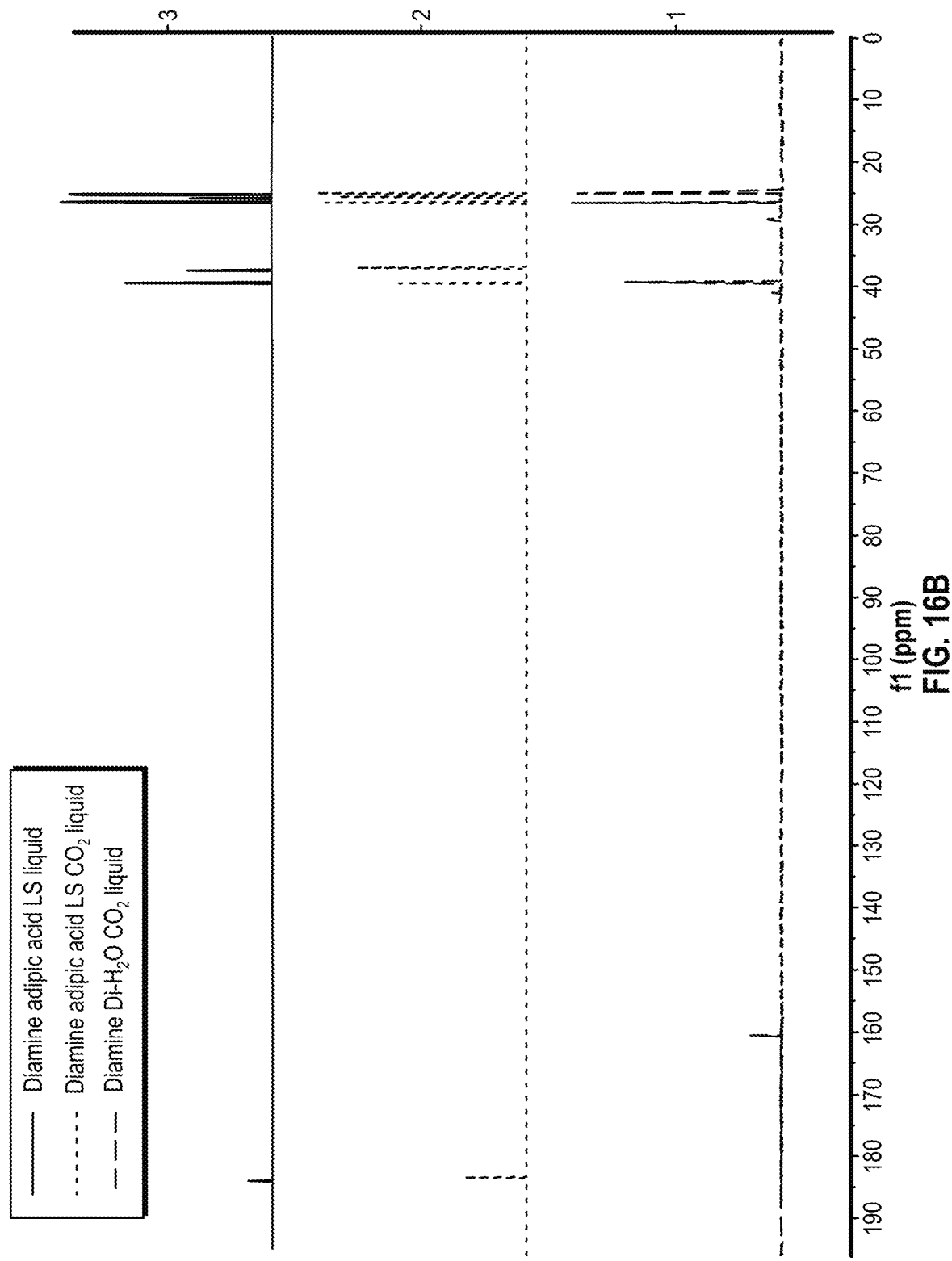
FIG. 16B provides the $^{13}$C NMR (in $D_2O$) spectra of the freeze-dried liquid phase from diamine adipic acid LS, diamine adipic acid LS $CO_2$, and diamine Di-$H_2O$ $CO_2$ samples.

FIG. 16B shows both the carbamate —NHCOO— peak at 165 ppm and the bicarbonate HCO3- peak at 160 ppm for "Diamine Di-H$_2$O CO$_2$," indicating that CO$_2$ reacts with diamine in water to form both carbamate and bicarbonate.

FIG. 16B shows —COO— 13C peak at 185 ppm, indicating the formation of adipate in the liquid phase of "Diamine adipic acid LS CO$_2$" and "Diamine adipic acid LS."

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached"

or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
    introducing a treatment fluid into a subterranean formation wellbore comprising a water layer, the treatment fluid comprising:
        an aqueous base fluid;
        a solid, nitrogen-containing waste plastic; and
        carbon dioxide;
    hydrolyzing the nitrogen-containing waste plastic in the aqueous base fluid under conditions in the subterranean formation wellbore, thereby forming hydrolysis reaction products;
    reacting the hydrolysis reaction products and the carbon dioxide in the subterranean formation wellbore; and
    forming a solid barrier above the water layer as a result of the reacting.

2. The method of claim 1, wherein at least a portion of the treatment fluid is introduced into the subterranean formation separately from a remaining portion of the treatment fluid.

3. The method of claim 1, wherein the nitrogen-containing waste plastic comprises a polyamide, a polyaramid, a polyimide, or any combination thereof.

4. The method of claim 1, wherein the nitrogen-containing waste plastic is a polyamide.

5. The method of claim 1, wherein the nitrogen-containing waste plastic is a polyamide and the hydrolysis reaction products are an acid and an amine.

6. The method of claim 1, wherein the aqueous base fluid comprises fresh water, saltwater, brine, seawater, produced water, waste water, or any combination thereof.

7. The method of claim 1, wherein the aqueous base fluid comprises a bivalent cation.

8. The method of claim 1, wherein the subterranean formation wellbore comprises a water layer.

9. The method of claim 1, wherein the nitrogen-containing waste plastic is present in an amount of from 8 wt. % to 30 wt. %, by weight of the aqueous base fluid.

10. The method of claim 1, wherein the reacting results in formation of a solid particulate.

11. The method of claim 1, wherein the reacting results in a formation of a solid particulate comprising a fiber, a gel, scale, or any combination thereof.

12. The method of claim 1, further comprising sequestering the carbon dioxide within the subterranean formation wellbore.

* * * * *